United States Patent
Xu et al.

(10) Patent No.: US 12,095,100 B2
(45) Date of Patent: Sep. 17, 2024

(54) ENERGY-STORAGE APPARATUS AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Weidong Xu, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/537,580

(22) Filed: Dec. 12, 2023

(65) Prior Publication Data
US 2024/0274931 A1 Aug. 15, 2024

(30) Foreign Application Priority Data
Feb. 9, 2023 (CN) .......................... 202310091089.6

(51) Int. Cl.
*H01M 50/15* (2021.01)
*H01M 50/16* (2021.01)
(Continued)

(52) U.S. Cl.
CPC ........... *H01M 50/15* (2021.01); *H01M 50/16* (2021.01); *H01M 50/30* (2021.01);
(Continued)

(58) Field of Classification Search
CPC ............. H01M 50/507; H01M 50/204; H01M 50/503; H01M 50/521
See application file for complete search history.

(56) References Cited

U.S. PATENT DOCUMENTS

2018/0254466 A1  9/2018  Aikata
2021/0043908 A1* 2/2021  Nagafuchi ........ H01M 10/0413
(Continued)

FOREIGN PATENT DOCUMENTS

CN    206610838 U    11/2017
CN    207183329 U    4/2018
(Continued)

OTHER PUBLICATIONS

WIPO, International Search Report and Written Opinion for International Patent Application No. PCT/CN2023/075288, Jun. 23, 2023, 12 pages.

(Continued)

*Primary Examiner* — Christopher P Domone
*Assistant Examiner* — Jonathan William Estes
(74) *Attorney, Agent, or Firm* — IP Spring

(57) ABSTRACT

An energy-storage apparatus and an electricity-consumption device are disclosed. The energy-storage apparatus includes a housing, an electrode assembly, an end cover assembly, and a first connector. The end cover assembly includes a top cover and a lower plastic assembly. The lower plastic assembly is disposed between the top cover and the electrode assembly. The top cover includes a first stimulus-response member. The lower plastic assembly includes a first-lower-plastic-member body having a first surface and a second surface, a first recess recessed from the second surface to the first surface, and a first vent hole defined in a recess bottom-wall of the first recess and penetrates through the recess bottom-wall and the first surface. A part of the first (Continued)

recess is blocked by the first connector, and the rest of the first recess exposed beyond the first connector forms a vent passage in communication with the first vent hole.

19 Claims, 11 Drawing Sheets

(51) Int. Cl.
 *H01M 50/30* (2021.01)
 *H01M 50/342* (2021.01)
 *H01M 50/578* (2021.01)
(52) U.S. Cl.
 CPC ....... *H01M 50/342* (2021.01); *H01M 50/578* (2021.01); *H01M 2200/20* (2013.01); *H01M 2220/20* (2013.01)

(56) References Cited

U.S. PATENT DOCUMENTS

| | | | |
|---|---|---|---|
| 2023/0031476 A1 | 2/2023 | Lei | |
| 2023/0035703 A1* | 2/2023 | Tang | H01M 10/48 |
| 2023/0128142 A1* | 4/2023 | Jung | H01M 50/30 |
| | | | 429/82 |

FOREIGN PATENT DOCUMENTS

| | | | |
|---|---|---|---|
| CN | 207818654 U | | 9/2018 |
| CN | 208127255 U | * | 11/2018 |
| CN | 208173680 U | | 11/2018 |
| CN | 208489243 U | | 2/2019 |
| CN | 212934729 U | | 4/2021 |
| CN | 213026283 U | | 4/2021 |
| CN | 113823868 A | | 12/2021 |
| CN | 114497836 A | | 5/2022 |
| CN | 114883708 A | | 8/2022 |
| CN | 115588817 A | | 1/2023 |
| EP | 0930662 A2 | | 7/1999 |
| JP | 2013175357 A | | 9/2013 |
| JP | 2014192106 A | | 10/2014 |
| JP | 2016091932 A | | 5/2016 |
| JP | 2017037718 A | | 2/2017 |
| JP | 2018037222 A | | 3/2018 |
| JP | 2019192416 A | | 10/2019 |
| JP | 2020004650 A | | 1/2020 |
| KR | 20060117846 A | | 11/2006 |
| WO | 2019131262 A1 | | 7/2019 |
| WO | 2021129360 A1 | | 7/2021 |
| WO | 2021157909 A1 | | 8/2021 |
| WO | 2023284523 A1 | | 1/2023 |

OTHER PUBLICATIONS

CNIPA, First Office Action for corresponding Chinese Patent Application No. 202310091089.6, May 9, 2023, 18 pages.
CNIPA, Notice of Allowance for corresponding Chinese Patent Application No. 202310091089.6, May 23, 2023, 10 pages.
EPO, Extended European Search Report for corresponding European Patent Application No. 23218301.2, Jun. 28, 2024, 10 pages.

* cited by examiner

ENERGY-STORAGE APPARATUS AND ELECTRICITY-CONSUMPTION DEVICE

CROSS-REFERENCE TO RELATED APPLICATIONS

This application claims priority under 35 U.S.C. § 119(a) to Chinese Patent Application No. 202310091089.6, filed Feb. 9, 2023, the entire disclosure of which is incorporated herein by reference.

TECHNICAL FIELD

This disclosure relates to the field of energy storage technology, and in particular to an energy-storage apparatus and an electricity-consumption device.

BACKGROUND

With continuous development of new-energy technologies, application ranges of rechargeable batteries become wider and wider. However, an existing battery is prone to accidents such as battery explosion and fire.

SUMMARY

In a first aspect, an energy-storage apparatus is provided in the present disclosure. The energy-storage apparatus includes a housing, an electrode assembly, an end cover assembly, and a first connector. The housing has an opening and defines an accommodating cavity. The electrode assembly is accommodated in the accommodating cavity. The end cover assembly seals the opening. The end cover assembly includes a top cover and a lower plastic assembly. The lower plastic assembly is disposed between the end cover and the electrode assembly. The end cover includes the first stimulus-response member. The first stimulus-response member is configured to deform in response to a pressure increase in the energy-storage apparatus. The lower plastic assembly at least includes a first-lower-plastic-member body. The first-lower-plastic-member body has a first surface facing the end cover assembly and a second surface opposite to the first surface. The first-lower-plastic-member body defines a first recess and a first vent hole penetrating through the first surface and the second surface. The first recess is recessed from the second surface to the first surface. The first vent hole is defined in a recess bottom-wall of the first recess and penetrates through the recess bottom-wall and the first surface in a thickness direction of the first-lower-plastic-member body. The first vent hole is opposite to the first stimulus-response member in the thickness direction of the end cover assembly. The first connector is connected between the end cover assembly and the electrode assembly. A part of the first recess is blocked by the first connector, and the rest of the first recess exposed beyond the first connector forms a vent passage. The vent passage is in communication with the first vent hole. A first protective grid is disposed in the first recess. The first protective grid is connected to a recess sidewall of the first recess. In a direction towards the second surface, the first protective grid is located above the first vent hole. The first protective grid defines a first vent portion. The first vent portion is in communication with the first recess. A part of the first vent portion is blocked by the first connector. The vent passage includes a part of the first vent portion exposed beyond the first connector.

In another aspect, an electricity-consumption device is provided in the present disclosure. The electricity-consumption device includes the energy-storage apparatus. The energy-storage apparatus is configured to power the electricity-consumption device. The energy-storage apparatus includes a housing, an electrode assembly, an end cover assembly, and a first connector. The housing has an opening and defines an accommodating cavity. The electrode assembly is accommodated in the accommodating cavity. The end cover assembly seals the opening. The end cover assembly includes a top cover and a lower plastic assembly. The lower plastic assembly is disposed between the end cover and the electrode assembly. The end cover includes the first stimulus-response member. The first stimulus-response member is configured to deform in response to a pressure increase in the energy-storage apparatus. The lower plastic assembly at least includes a first-lower-plastic-member body. The first-lower-plastic-member body has a first surface facing the end cover assembly and a second surface opposite to the first surface. The first-lower-plastic-member body defines a first recess and a first vent hole penetrating through the first surface and the second surface. The first recess is recessed from the second surface to the first surface. The first vent hole is defined in a recess bottom-wall of the first recess and penetrates through the recess bottom-wall and the first surface in a thickness direction of the first-lower-plastic-member body. The first vent hole is opposite to the first stimulus-response member in the thickness direction of the end cover assembly. The first connector is connected between the end cover assembly and the electrode assembly. A part of the first recess is blocked by the first connector, and the rest of the first recess exposed beyond the first connector forms a vent passage. The vent passage is in communication with the first vent hole. A first protective grid is disposed in the first recess. The first protective grid is connected to a recess sidewall of the first recess. In a direction towards the second surface, the first protective grid is located above the first vent hole. The first protective grid defines a first vent portion. The first vent portion is in communication with the first recess. A part of the first vent portion is blocked by the first connector. The vent passage includes a part of the first vent portion exposed beyond the first connector.

BRIEF DESCRIPTION OF THE DRAWINGS

To explain technical solutions in the present disclosure more clearly, the following will give a brief introduction to the accompanying drawings required to be used in the implementations. The accompanying drawings in the following description are only some implementations of the present disclosure. For those of ordinary skill in the art, other accompanying drawings can be obtained according to these accompanying drawings.

DETAILED DESCRIPTION

Technical solutions of implementations of the present disclosure will be described clearly and completely with reference to accompanying drawings in embodiments of the present disclosure. Embodiments described herein are merely some embodiments, rather than all embodiments, of the present disclosure. Based on embodiments of the present disclosure, all other embodiments obtained by those of ordinary skill in the art shall fall within the protection scope of the present disclosure.

With continuous development of new-energy technologies, application ranges of rechargeable batteries become wider and wider. For example, a stimulus-response member is disposed on a smooth aluminum member of an end cover assembly of a battery. When air pressure inside a cell reaches a certain value, the stimulus-response member can be flipped over to contact an upper conductive block, so that the battery is short-circuited to prevent the battery from being overcharged, thereby avoiding accidents such as battery explosion and fire. However, an existing battery is still prone to accidents such as battery explosion and fire.

An energy-storage apparatus is provided in the present disclosure, which can ensure that gas in the energy-storage apparatus can smoothly flow below a stimulus-response member, and can solve a technical problem of affecting a function of the stimulus-response member due to unsmooth gas circulation.

Figure 1:
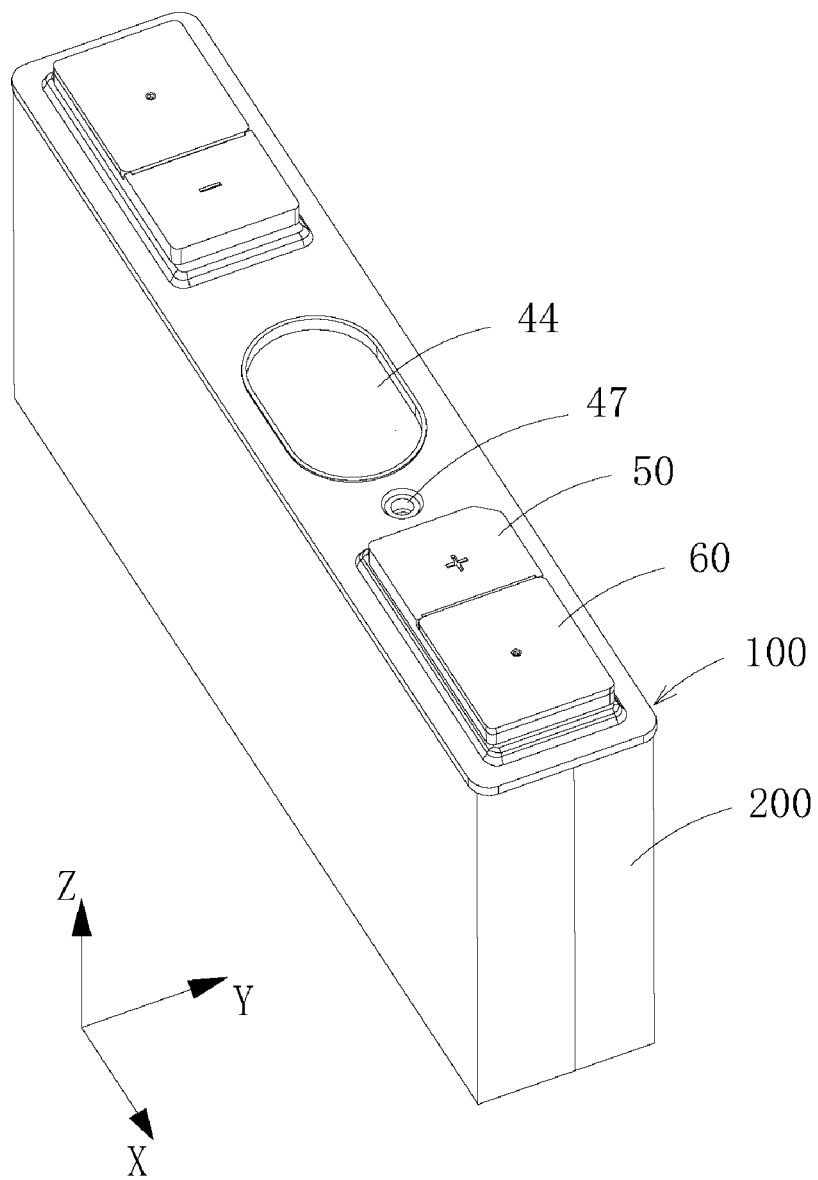
FIG. 1 is a partial schematic structural view of an energy-storage apparatus provided in an embodiment of the present disclosure, where a housing is not illustrated.
Figure 2:
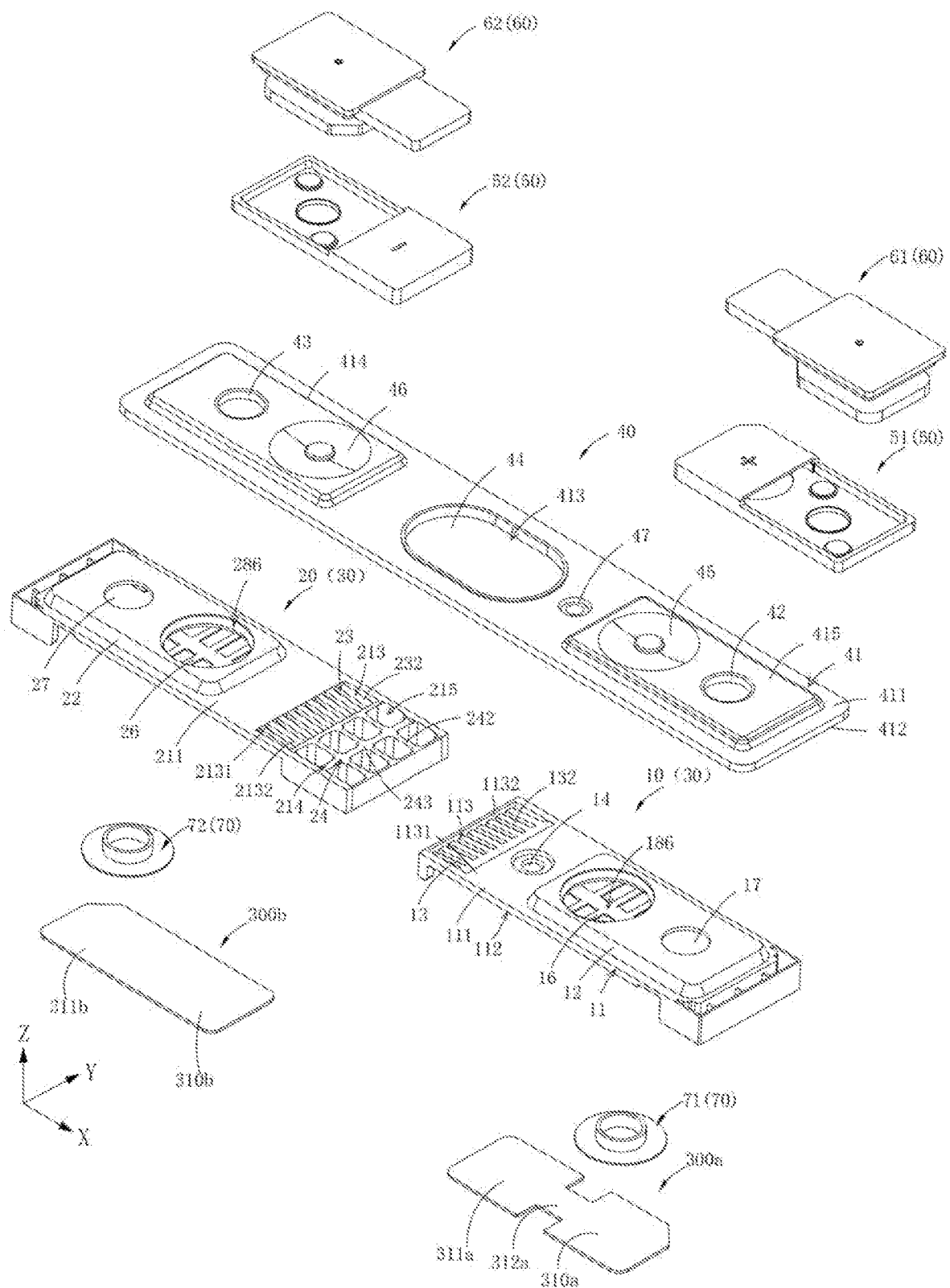
FIG. 2 is a partial exploded schematic structural view of the energy-storage apparatus illustrated in FIG. 1.
Figure 10:
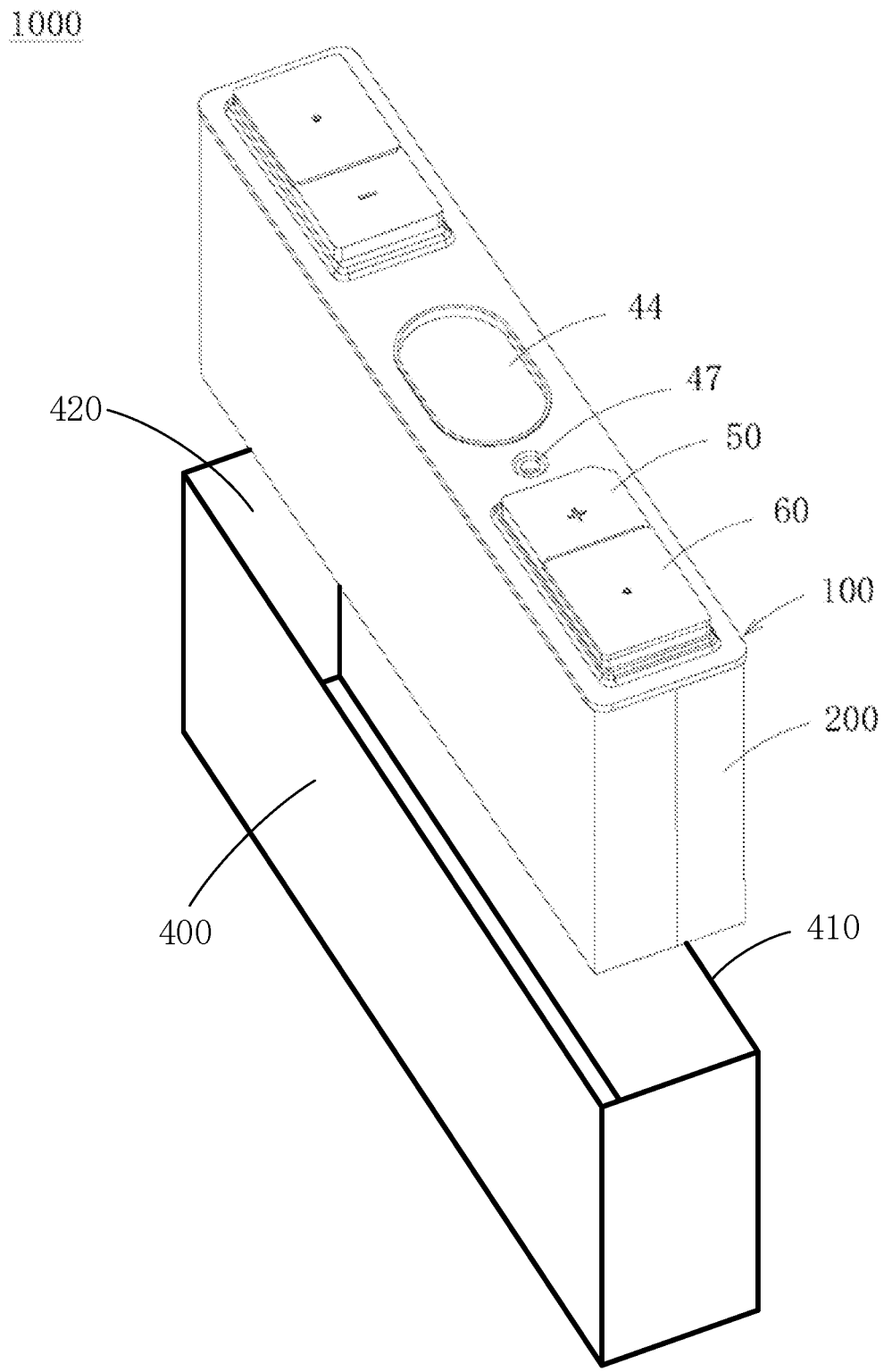
FIG. 10 is a schematic structural view of the energy-storage apparatus illustrated in FIG. 1.
Figure 11:
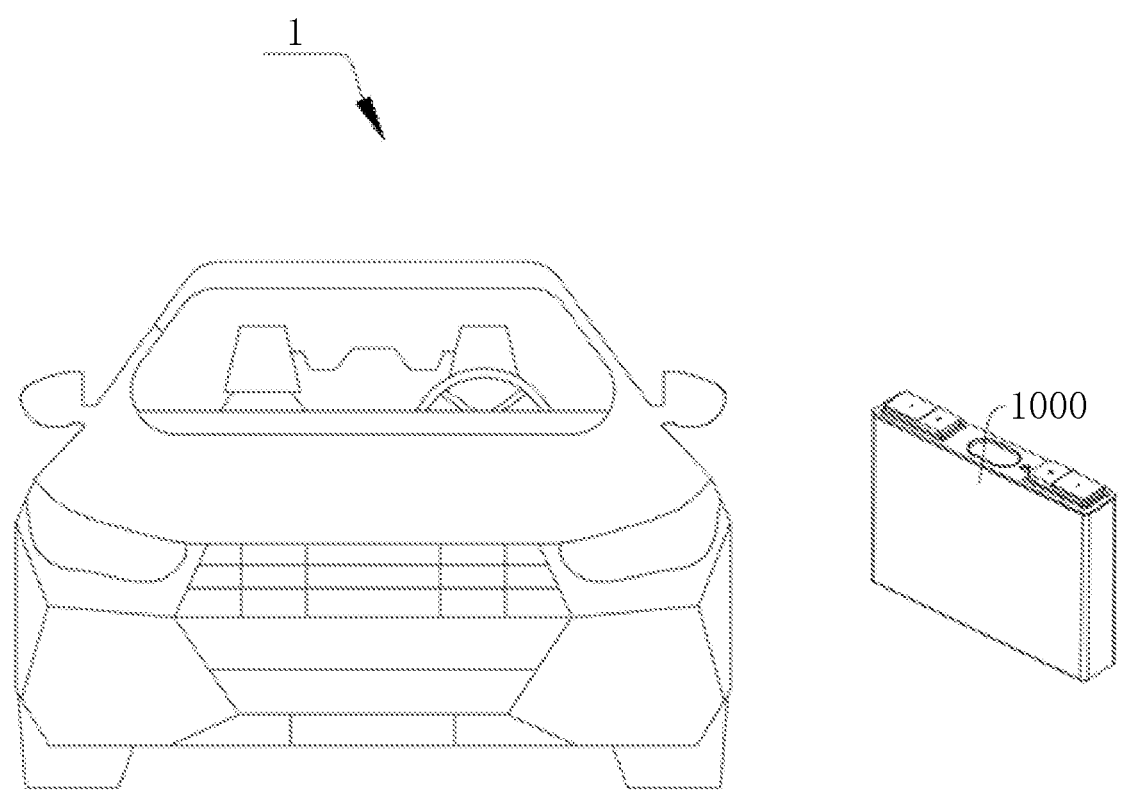
FIG. 11 is a schematic structural view of an electricity-consumption device provided in an embodiment of the present disclosure.

Reference can be made to FIG. 1, FIG. 2, FIG. 10, and FIG. 11, where FIG. 1 is a partial schematic structural view of an energy-storage apparatus 1000 provided in an embodiment of the present disclosure, FIG. 2 is a partial exploded schematic structural view of the energy-storage apparatus 1000 illustrated in FIG. 1, FIG. 10 is a schematic structural view of the energy-storage apparatus 1000 illustrated in FIG. 1, and FIG. 11 is a schematic structural view of an electricity-consumption device 1 provided in an embodiment of the present disclosure.

An energy-storage apparatus 1000 including an end cover assembly 100 and an electricity-consumption device 1 adopting the energy-storage apparatus 1000 are provided in the present disclosure. For example, the energy-storage apparatus 1000 in this embodiment is a battery. The energy-storage apparatus 1000 includes a housing 400, an end cover assembly 100, and an electrode assembly 200. The end cover assembly 100 is mounted at an end of the electrode assembly 200. The housing 400 wraps around the electrode assembly 200 and the bottom of the electrode assembly 200. The housing 400 seals and is connected to the end cover assembly 100.

It may be understood that the energy-storage apparatus 1000 may include, but is not limited to, a single battery, a battery module, a battery pack, a battery system, and the like. When the energy-storage apparatus is a single battery, the energy-storage apparatus may be a prismatic cell.

For example, the electricity-consumption device 1 is a vehicle. The vehicle may be a fuel vehicle, a gas vehicle, or a new-energy vehicle. The new-energy vehicle may be a pure electric vehicle, a hybrid electric vehicle, an extended-range electric vehicle, etc. A vehicle includes a battery, a controller, and a motor. The battery is configured to power the controller and the motor, and is used as a power supply for operation and driving of the vehicle. For example, the battery is used for operational power requirements during starting, navigation, and operation of the vehicle. For another example, the battery powers the controller, the controller controls the battery to power the motor, and the motor receives power from the battery and uses the power to drive the vehicle, thereby replacing or partially replacing fuel oil or natural gas to provide driving power for the vehicle.

It may be understood that a practical application scenario of the energy-storage apparatus 1000 provided in embodiments of the present disclosure may be, but is not limited to, the listed products, and may also be other application scenarios, which is not strictly limited in the embodiments of the present disclosure.

For the convenience of illustration, a length direction of an end cover assembly illustrated in FIG. 1 is defined as an X-axis direction. A width direction of the end cover assembly illustrated in FIG. 1 is defined as a Y-axis direction. A height direction of the end cover assembly illustrated in FIG. 1 is defined as a Z-axis direction. The X-axis direction, the Y-axis direction, and the Z-axis direction are perpendicular to one another. Orientational terms such as "upper", "lower", "top", "bottom", etc., mentioned in description of embodiments of the present disclosure are described based on orientations as illustrated in FIG. 1 of the specification. "Upper" refers to a direction towards a positive direction of the Z-axis, and "lower" refers to a direction towards a negative direction of the Z-axis, which do not form a limitation to the energy-storage apparatus in practical application scenarios.

Figure 3:
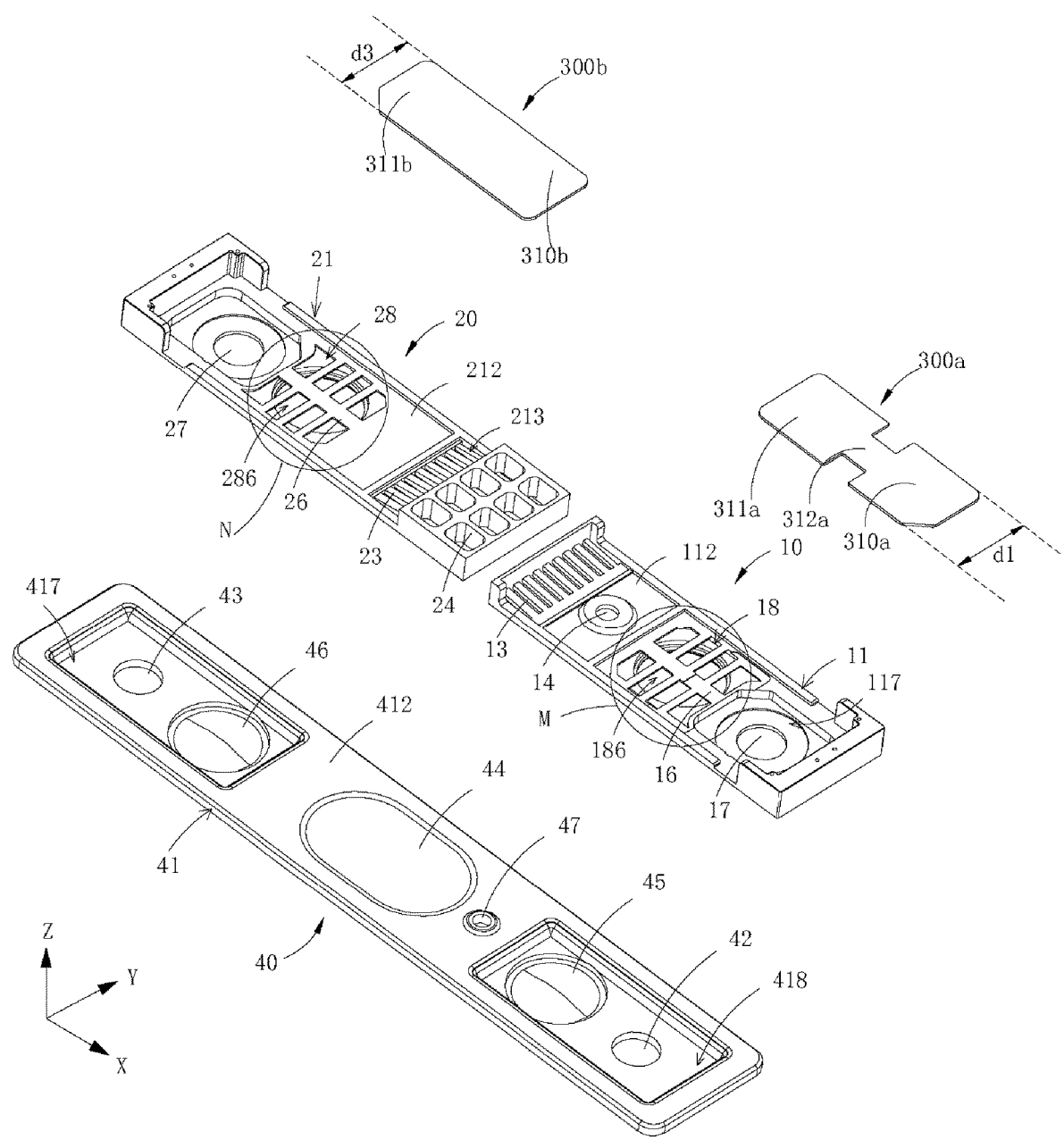
FIG. 3 is a partial exploded schematic structural view of the energy-storage apparatus illustrated in FIG. 1 from another perspective.
Figure 6:
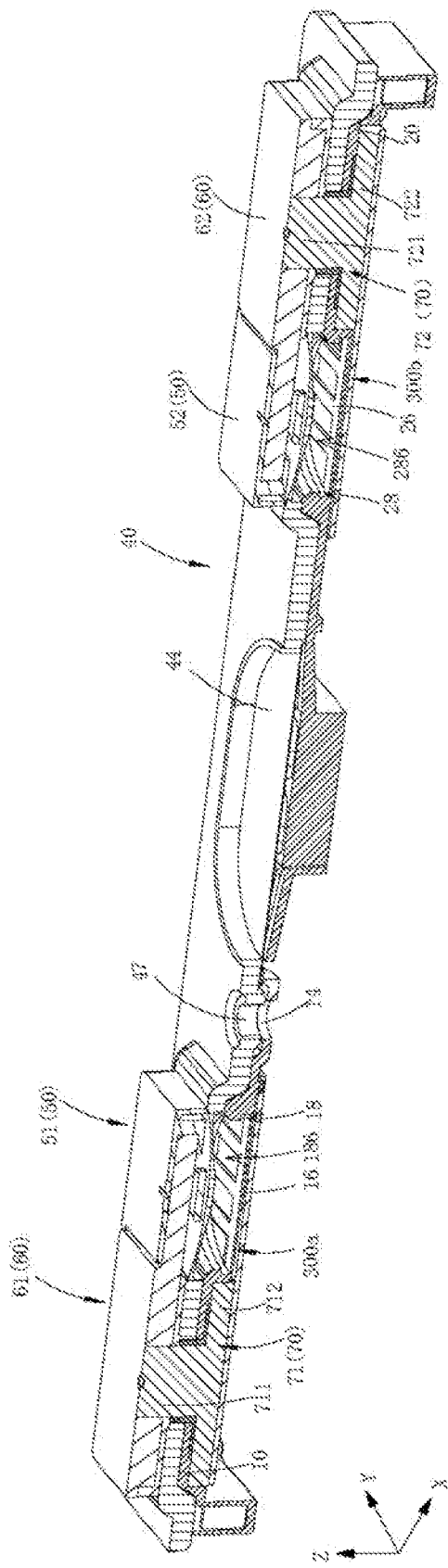
FIG. 6 is a partial schematic cross-sectional structural view of the energy-storage apparatus illustrated in FIG. 1 after assembly.

Reference can be made to FIG. 3 and FIG. 6, where FIG. 3 is a partial exploded schematic structural view of the energy-storage apparatus 1000 illustrated in FIG. 1 from another perspective, and FIG. 6 is a partial schematic cross-sectional structural view of the energy-storage apparatus 1000 illustrated in FIG. 1 after assembly.

An energy-storage apparatus 1000 is provided in the present disclosure. The energy-storage apparatus 1000 includes an end cover assembly 100, an electrode assembly 200, a first connector 300a for connecting the electrode assembly 200 and a positive electrode of the end cover assembly 100, and a second connector 300b for connecting the electrode assembly 200 and a negative electrode of the end cover assembly 100. The energy-storage apparatus 1000 further includes a housing 400. The housing 400 has an opening 410 and defines an accommodating cavity 420. The electrode assembly 200 is accommodated in the accommodating cavity 420. The end cover assembly 100 seals the opening 410.

The end cover assembly 100 includes a lower plastic assembly 30 and a top cover 40. The lower plastic assembly 30 is mounted on the top cover 40. In this embodiment, the top cover 40 is a smooth aluminum member. The lower plastic assembly 30 is made of a plastic material and insulated. The end cover assembly 100 further includes an upper plastic assembly 50, a pressing block assembly 60, and a pole 70. Specifically, the upper plastic assembly 50 and the top cover 40 are stacked. The upper plastic assembly 50 is located at a side of the top cover 40 away from the lower plastic assembly 30. The pole 70 includes a positive pole 71 and a negative pole 72. The positive pole 71 and the negative pole 72 are arranged side by side and are spaced apart from each other in the length direction (i.e., the X-axis direction) of the end cover assembly 100. The upper plastic assembly 50 includes a first upper plastic member 51 and a second upper plastic member 52. The first upper plastic member 51 and the second upper plastic member 52 are arranged side by side at two ends of the top cover 40 in the length direction (i.e., the X-axis direction) of the end cover assembly 100. The first upper plastic member 51 defines a through hole (not illustrated) allowing the positive pole 71 to pass through. The second upper plastic member 52 defines a through hole (not illustrated) allowing the negative pole 72 to pass through. The pressing block assembly 60 includes a first pressing block 61 and a second pressing block 62. The first pressing block 61 and the second pressing block 62 both are stacked at a side of the upper plastic assembly 50 away from the top cover 40, and are fixedly connected to the first upper plastic member 51 and the second upper plastic member 52 respectively. The positive pole 71 includes a first cylinder 711 and a first flange-portion 712. The negative pole 72 includes a second cylinder 721 and a second flange-portion 722.

The first connector 300a is substantially rectangular and includes a first pole-connecting-body 311a, a first tab-connecting-body 310a, and a connecting section 312a for connecting the first pole-connecting-body 311a and the first tab-connecting-body 310a. A width dimension of the first pole-connecting-body 311a and a width dimension of the first tab-connecting-body 310a in the width direction (the Y axis) of the end cover assembly are the same and fixed. The width of the first tab-connecting-body 310a may also be construed as the width of the first connector 300a. The first pole-connecting-body 311a is connected to the positive pole 71. The first tab-connecting-body 310a is connected to a tab. Therefore, the first connector 300a mainly serves a function of connection and conduction in the energy-storage apparatus 1000, that is, indirectly connecting the positive pole 71 and the tab through the first connector 300a.

The second connector 300b is the same as the first connector 300a in structure, material, and function. The second connector 300b includes a second pole-connecting-body 311b and a second tab-connecting-body 310b. The second pole-connecting-body 311b is connected to the second tab-connecting-body 310b in the length direction (i.e., the X-axis direction) of the end cover assembly 100. The second pole-connecting-body 311b is the same as the second tab-connecting-body 310b in width. It can be understood that the width of the second tab-connecting-body 310b is the width of the second connector 300b. The second pole-connecting-body 311b and the second tab-connecting-body 310b are arranged side by side in the X-axis direction and are connected to each other. The second pole-connecting-body 311b is connected to the negative pole 72. The second tab-connecting-body 310b is connected to a tab.

The first connector 300a and the second connector 300b both are stacked on the lower plastic assembly 30. Specifically, the first pole-connecting-body 311a of the first connector 300a is fixedly connected to a surface of the first flange-portion 712 away from the first cylinder 711 by a process such as welding. The second pole-connecting-body 311b of the second connector 300b is fixedly connected to a surface of the second flange-portion 722 away from the second cylinder 721 by a process such as welding.

As illustrated in FIG. 2 and FIG. 3, in this embodiment, the top cover 40 includes a top-cover body 41, an explosion-proof valve 44, a first stimulus-response member 45, and a second stimulus-response member 46. The top-cover body 41 defines a first through-hole 42, a second through-hole 43, and a liquid-injection hole 47. In the X-axis direction, that is, the length direction of the top-cover body 41, the first through-hole 42, the first stimulus-response member 45, the liquid-injection hole 47, the explosion-proof valve 44, the second stimulus-response member 46, and the second through-hole 43 are arranged at intervals in sequence.

Specifically, the top-cover body 41 is an elongated thin plate, and includes a front face 411, a back face 412 opposite to the front face 411, a first mounting recess 417, and a second mounting recess 418. The first mounting recess 417 and the second mounting recess 418 are located at two opposite ends (i.e., arranged in the X-axis direction) of the back face 412 of the top-cover body 41. Each of the first mounting recess 417 and the second mounting recess 418 is a rectangular recess, the first mounting recess 417 is recessed from the back face 412 to the front face 411, and a first protrusion 414 is formed on the front face 411. The second mounting recess 418 is recessed from the back face 412 to the front face 411, and a second protrusion 415 is formed on the front face 411.

The first protrusion 414 protrudes from the front face 411. In practice, a back face of the first protrusion 414 is a recess bottom-wall of the first mounting recess 417. The first through-hole 42 penetrates through the first protrusion 414. The first protrusion 414 defines a through hole (not illustrated) at a side of the first through-hole 42. The first stimulus-response member 45 is accommodated in the through-hole and welded to a hole wall of the through-hole.

The second protrusion 415 protrudes from the front face 411. In practice, a back face of the second protrusion 415 is a recess bottom-wall of the second mounting recess 418. The second through-hole 43 penetrates through the second protrusion 415. The second protrusion 415 defines a through-hole (not illustrated) at a side of the second through-hole 43. The second stimulus-response member 46 is accommodated in the through-hole and welded to a hole wall of the through-hole.

In practice, in the energy-storage apparatus, the stimulus-response member is configured to generate stress deformation in response to a pressure increase in the energy-storage apparatus, so that when the gas in the energy-storage apparatus 1000 exceeds a preset pressure threshold, the stimulus-response member can be in contact with a metal conductive pressing block due to stress deformation, causing a positive-electrode assembly and a negative-electrode assembly to be externally short-circuited. Thus, due to a strong short-circuit current, fuse blowing occurs at the stimulus-response member and the bottom of the metal conductive pressing block (such as the first stimulus-response member 45 and the first pressing block 61), and the positive-electrode assembly and the negative-electrode assembly return to be disconnected. Therefore, excessive charging of the energy-storage apparatus can be avoided, thereby avoiding explosion of the energy-storage apparatus.

The top-cover body 41 further defines a through slot 413 penetrating through the back face 412 and the front face 411 at the middle of the top-cover body 41. The through slot 413 is located between the first mounting recess 417 and the second mounting recess 418. The explosion-proof valve 44 is accommodated in the through slot 413 and is welded with a slot wall of the through slot 413. When the internal pressure of the electrode assembly is excessively high, the explosion-proof valve 44 will automatically open for pressure relief, so as to prevent explosion.

It can be understood that the first through-hole 42 and the second through-hole 43 are respectively defined at two opposite ends of the top-cover body 41, and respectively allow the positive pole 71 of the battery and the negative pole 72 of the battery to pass through. The first stimulus-response member 45 is disposed at a side of the first through-hole 42 close to the explosion-proof valve 44. The second stimulus-response member 46 is disposed at a side of the second through-hole 43 close to the explosion-proof valve 44. In the thickness direction of the end cover assembly 100, the first stimulus-response member 45 is disposed opposite to the first pressure block 61. The second stimulus-response member 46 is disposed opposite to the second pressure block 62. When the internal pressure of the electrode assembly 200 is relatively high, the first stimulus-response member 45 may be bent and deformed upward to reach the first pressing block 61 or the second stimulus-response member 46 may be bent and deformed upward to reach the second pressing block 62. Thus, the battery is short-circuited, and a protective effect is realized.

The liquid-injection hole 47 is defined between the first stimulus-response member 45 and the explosion-proof valve 44. In a liquid-injection process of a power battery, electrolyte is injected into the battery through the liquid-injection hole 47 on the top cover 40.

In this embodiment, the lower plastic assembly 30 includes a first lower plastic member 10 and a second lower plastic member 20. The first lower plastic member 10 and the second lower plastic member 20 are mounted side by side at a side of the top cover 40 in the X-axis direction. The first lower plastic member 10 and the second lower plastic member 20 both are stacked on the top cover 40. The first lower plastic member 10 and the second lower plastic member 20 each have the same width as the top cover 40, where a certain tolerance range is allowed. In this embodiment, each of the first lower plastic member 10 and the second lower plastic member 20 is an independent component. In other implementations, the first lower plastic member 10 and the second lower plastic member 20 are integrally formed.

In this embodiment, the first lower plastic member 10 includes a first-lower-plastic-member body 11 and a first snapped protrusion 12. The first-lower-plastic-member body 11 is a substantially rectangular thin plate, and has a first surface 111 and a second surface 112 opposite to the first surface 111 in the Z-axis direction. Specifically, the first snapped protrusion 12 protrudes from the first surface 111 of the first-lower-plastic-member body 11, and is located at an end of the first-lower-plastic-member body 11 in the length direction (i.e., the X-axis direction) of the first lower plastic member 10. The first-lower-plastic-member body 11 further defines a first through-slot 113 at an end of the first-lower-plastic-member body 11 away from the first snapped protrusion 12. The first through-slot 113 is a rectangular through-slot and penetrates through the first surface 111 and the second surface 112. The first through-slot 113 includes a first slot-sidewall 1131 and a second slot-sidewall 1132 that are disposed opposite to each other in the X-axis direction. Pressure gas generated in the electrode assembly 200 is directed by the first through-slot 113 to the explosion-proof valve 44.

In this embodiment, the first lower plastic member 10 further includes a first explosion-proof-grid 13, a liquid-injection region 14, a first protective grid 16, and a first pole through-hole 17. The first-lower-plastic-member body 11 defines a first recess 18 and a first vent hole 186. In the length direction (i.e., the X-axis direction) of the first lower plastic member 10, the first explosion-proof-grid 13, the liquid-injection region 14, the first recess 18, and the first pole through-hole 17 are located on the first-lower-plastic-member body 11 in sequence.

In this embodiment, the first explosion-proof-grid 13 is disposed in the first through-slot 113 and includes multiple first grids 132 arranged side by side at intervals. The multiple first grids 132 each have one end fixed to the first slot-sidewall 1131 of the first through-slot 113. The multiple first grids 132 each extend towards the second slot-sidewall 1132 that is located at an end of the first-lower-plastic-member body 11. The multiple first grids 132 each have the other end fixed to the second slot-sidewall 1132 of the first through-slot 113. It can be understood that the other end of each of the multiple first grids 132 fixed to the second sidewall 1132 is inclined towards the second surface 112. The liquid-injection region 14 penetrates through the first surface 111 of the first-lower-plastic-member body 11 and the second surface 112 of the first-lower-plastic-member body 11.

The first pole through-hole 17 is a circular through-hole. The first pole through-hole 17 penetrates through the first surface 111 and the second surface 112. The first pole through-hole 17 penetrates through the first snapped protrusion 12 and is close to an end of the first-lower-plastic-member body 11. The first pole through-hole 17 allows the positive pole 71 to pass through.

The first recess 18 is substantially rectangular, and is recessed from the second surface 112 to the first surface 111 in a thickness direction of the first-lower-plastic-member body 11. The first recess 18 corresponds to the first snapped protrusion 12. The first recess 18 is located between the liquid-injection region 14 and the first pole through-hole 17.

The first vent hole 186 is defined at a bottom wall of the first recess 18. The first vent hole 186 penetrates through a surface of the bottom wall of the first recess 18 and the first surface 111. The pressure gas generated in the electrode assembly 200 is directed by the first vent hole 186 to the first stimulus-response member 45. In addition, due to arrangement of the first connector 300a, protection is further provided, that is, a risk of short circuit caused by a direct contact between the first stimulus-response member 45 and broken pieces of the tab directly entering the first vent hole 186 is prevented.

The first protective grid 16 is a grid-shaped thin plate and is formed in the first recess 18. The first protective grid 16 may be made of a plastic material, and may be integrated with the first lower plastic member 10. The first protective grid 16 covers the first vent hole 186 in the thickness direction of the first-lower-plastic-member body 11, that is, blocks the first vent hole 186. An orthographic projection area of the first protective grid 16 in the thickness direction (i.e., the Z-axis direction) of the first-lower-plastic-member body 11 is greater than an orthographic projection area of the first vent hole 186 in the thickness direction (i.e., the Z-axis direction) of the first-lower-plastic-member body 11.

A cross-sectional area of the first vent hole 186 is three-fifths to nine-tenths of a cross-sectional area of the first recess 18. Thus, a vent function of the first vent hole 186 is ensured, and strength of the first protective grid 16 of the first recess 18 is ensured.

The first-lower-plastic-member body 11 further defines a first accommodating recess 117. The positive pole 71 is mounted in the accommodating recess 117. The first accommodating recess 117 is recessed from the second surface 112 and is located at an end of the first-lower-plastic-member body 11 away from the liquid-injection region 14. In the thickness direction (i.e., the Z-axis direction) of the first-lower-plastic-member body 11, the first pole through-hole 17 penetrates through a recess bottom-wall of the first accommodating recess 117. The first accommodating recess 117 is adjacent to the first protective grid 16.

The first lower plastic member 10 is stacked at a side of the top cover 40 defining the liquid-injection hole 47. The first surface 111 of the first lower plastic member 10 faces and is attached to the back face 412 of the top cover 40. The first snapped protrusion 12 is inserted into the first mounting recess 417. The first snapped protrusion 12 and the first mounting recess 417 can be snapped with each other to realize mutual positioning. In the Z-axis direction, the first pole through-hole 17 of the first lower plastic member 10 is coaxially disposed with and in communication with the first through-hole 42 of the top cover 40. The first vent hole 186 of the first lower plastic member 10 is coaxially disposed with the through hole of the top cover 40. The first vent hole 186 directly faces the first stimulus-response member 45. The first liquid-injection region 14 of the first lower plastic member 10 is in communication with the liquid-injection hole 47 of the top cover 40. The first explosion-proof-grid 13 of the first lower plastic member 10 faces a part of the explosion-proof valve 44 of the top cover 40.

In this embodiment, the second lower plastic member 20 includes a second-lower-plastic-member body 21 and a second snapped protrusion 22. The second-lower-plastic-member body 21 is a substantially rectangular thin plate, and has a third surface 211 and a fourth surface 212 opposite to the third surface 211 in the Z-axis direction. Specifically, the second snapped protrusion 22 protrudes from the third surface 211 of the second-lower-plastic-member body 21, and is located at an end of the second-lower-plastic-member body 21 in the X-axis direction.

The second-lower-plastic-member body 21 further defines a second through-slot 213 and a third through-slot 214 at an end of the second-lower-plastic-member body 21 away from the second snapped protrusion 22. The second through-slot 213 and the third through-slot 214 are disposed side by side at intervals in the X-axis direction. The second through-slot 213 is a rectangular through slot and penetrates through the third surface 211 and the fourth surface 212. The second through-slot 213 includes a third slot-sidewall 2131 and a fourth slot-sidewall 2132 that are disposed opposite to each other in the X-axis direction. The third through-slot 214 is a rectangular through slot, and the third through-slot 214 penetrates through the third surface 211 and the fourth surface 212. The second through-slot 213 and the third through-slot 214 each allow the pressure gas generated in the electrode assembly 200 to pass through.

In this embodiment, the second lower plastic member 20 further includes a second explosion-proof-grid 23, a third explosion-proof-grid 24, a second protective grid 26, a second pole through-hole 27, a second recess 28, and a second vent hole 286. In the length direction (i.e., the X-axis direction) of the second lower plastic member 20, the third explosion-proof-grid 24, the second explosion-proof-grid 23, the second recess 28, and the second pole through-hole 27 are located on the second-lower-plastic-member body 21 in sequence.

The second explosion-proof-grid 23 is disposed in the second through-slot 213 and includes multiple second grids 232 arranged side by side at intervals in the width direction of the second lower plastic member 20. The multiple second grids 232 each have one end fixed to the third slot-sidewall 2131 of the second through-slot 213. The multiple second grids 232 each extend towards the fourth slot-sidewall 2132 that is located at an end of the second-lower-plastic-member body 21. The multiple second grids 232 each have the other end fixed to the fourth slot-sidewall 2132 of the second through-slot 213. The other end of each of the multiple second grids 232 fixed to the fourth slot-sidewall 2132 is inclined towards the fourth surface 212. The multiple second grids 232 divide the second through-slot 213 into multiple rectangular through holes.

The third explosion-proof-grid 24 is disposed in the third through-slot 214 and includes multiple first baffles 242 and a second baffle 243. The multiple first baffles 242 are arranged side by side at intervals in the Y-axis direction. Each first baffle 242 is connected to two opposite sidewalls of the third through-slot 214 in the X-axis direction. The second baffle 243 penetrates through the multiple first baffles 242 in the Y-axis direction, and is connected to two opposite sidewalls of the third through-hole 214 in the Y-axis direction. It can be understood that the multiple first baffles 242 and the second baffle 243 cooperatively define multiple sub through-slots 215 arranged in an array in the third through-slot 214.

The second pole through-hole 27 is a circular through hole. The second pole through-hole 27 penetrates through the third surface 211 and the fourth surface 212. The second pole through-hole 27 penetrates through the second snapped protrusion 22 and is close to an end of the second-lower-plastic-member body 21. The second pole through-hole 27 allows the negative pole 72 to pass through.

The second recess 28 is substantially rectangular and is recessed from the fourth surface 212 to the third surface 211 in the thickness direction of the second-lower-plastic-member body 21. The second recess 28 corresponds to the second snapped protrusion 22 and is close to an end of the second explosion-proof-grid 23.

The second vent hole 286 is defined in a bottom wall of the second recess 28. The second vent hole 286 penetrates through a surface of the bottom wall of the second recess 28 and the third surface 211. The pressure gas generated in the electrode assembly is directed by the second vent hole 286 to the second stimulus-response member 46. In addition, due to arrangement of the second connector 300b, protection can be further provided for the second vent hole 286, that is, a risk of short circuit caused by a direct contact between the second stimulus-response member 46 and broken pieces of the tab directly entering the second vent hole 286 is prevented.

The second protective grid 26 is a grid-shaped thin plate and is formed in the second recess 28. The second protective grid 26 may be made of a plastic material, and may be integrated with the second lower plastic member 20. The second protective grid 26 covers the second vent hole 286 in the thickness direction of the second-lower-plastic-member body 21, that is, blocks the second vent hole 286. An orthographic projection area of the second protective grid 26 in the thickness direction (i.e., the Z-axis direction) of the second-lower-plastic-member body 21 is greater than an orthographic projection area of the second vent hole 286 in the thickness direction (i.e., the Z-axis direction) of the second-lower-plastic-member body 21. In one embodiment, a cross-sectional area of the second vent hole 286 is three-fifths to nine-tenths of a cross-sectional area of the second recess 28.

The second-lower-plastic-member body 21 further defines a second accommodation recess 217. The negative pole 72 is mounted in the second accommodation recess 217. The second accommodation recess 217 is recessed from the fourth surface 212 and is located at an end of the second-lower-plastic-member body 21 away from the second through-slot 213. In the thickness direction (i.e., the Z-axis direction) of the second-lower-plastic-member body 21, the second pole through-hole 27 penetrates through a recess bottom-wall of the second accommodation recess 217. The second accommodation recess 217 is adjacent to the second protective grid 26.

The second lower plastic member 20 is stacked on the back face 412 of the top cover 40. An end of the second lower plastic member 20 abuts against an end of the first lower plastic member 10. Each of the length direction of the second lower plastic member 20 and the length direction of the first lower plastic member 10 is the same as the length direction of the top cover 40. Specifically, the third surface 211 of the second lower plastic member 20 faces and is attached to the back face 412 of the top cover 40. The second snapped protrusion 22 is inserted into the second mounting recess 418. The second snapped protrusion 22 and the second mounting recess 418 can be snapped with each other to realize mutual positioning. In the thickness direction (i.e., the Z-axis direction) of the end cover assembly, the second pole through-hole 27 of the second lower plastic member 20 is coaxially disposed with and in communication with the second through-hole 43 of the top cover 40. The second vent hole 286 of the second lower plastic member 20 is disposed coaxially with the through hole of the top cover 40. The second vent hole 286 directly faces the second stimulus-response member 46. The second explosion-proof-grid 23 of the second lower plastic member 20 and the third explosion-proof-grid 24 of the second lower plastic member 20 face a part of the explosion-proof valve 44 of the top cover 40.

In this embodiment of the present disclosure, the first connector 300a is stacked on the second surface 112. The first connector 300a blocks a part of the first recess 18. A vent passage S is defined between the first connector 300a and the first recess 18. The vent passage is in communication with the first vent hole 186. Specifically, in the width direction of the first-lower-plastic-member body 11, a dimension of the first connector 300a is less than a maximum dimension of the first recess 18. In an embodiment, in the width direction of the first-lower-plastic-member body 11, a ratio of a dimension d2 of the first recess 18 to a dimension d1 of the first connector 300a is 1.01-1.4, where the ratio includes 1.01 and 1.4, as well as any values between 1.01 and 1.4, such as 1.08, 1.1, 1.2, etc.

In an embodiment, in the width direction of the first-lower-plastic-member body 11, the vent passage is located at two opposite sides of the first connector 300a. In another embodiment, in the width direction of the first-lower-plastic-member body 11, the vent passage is located at a side of the first connector 300a.

Figure 4:
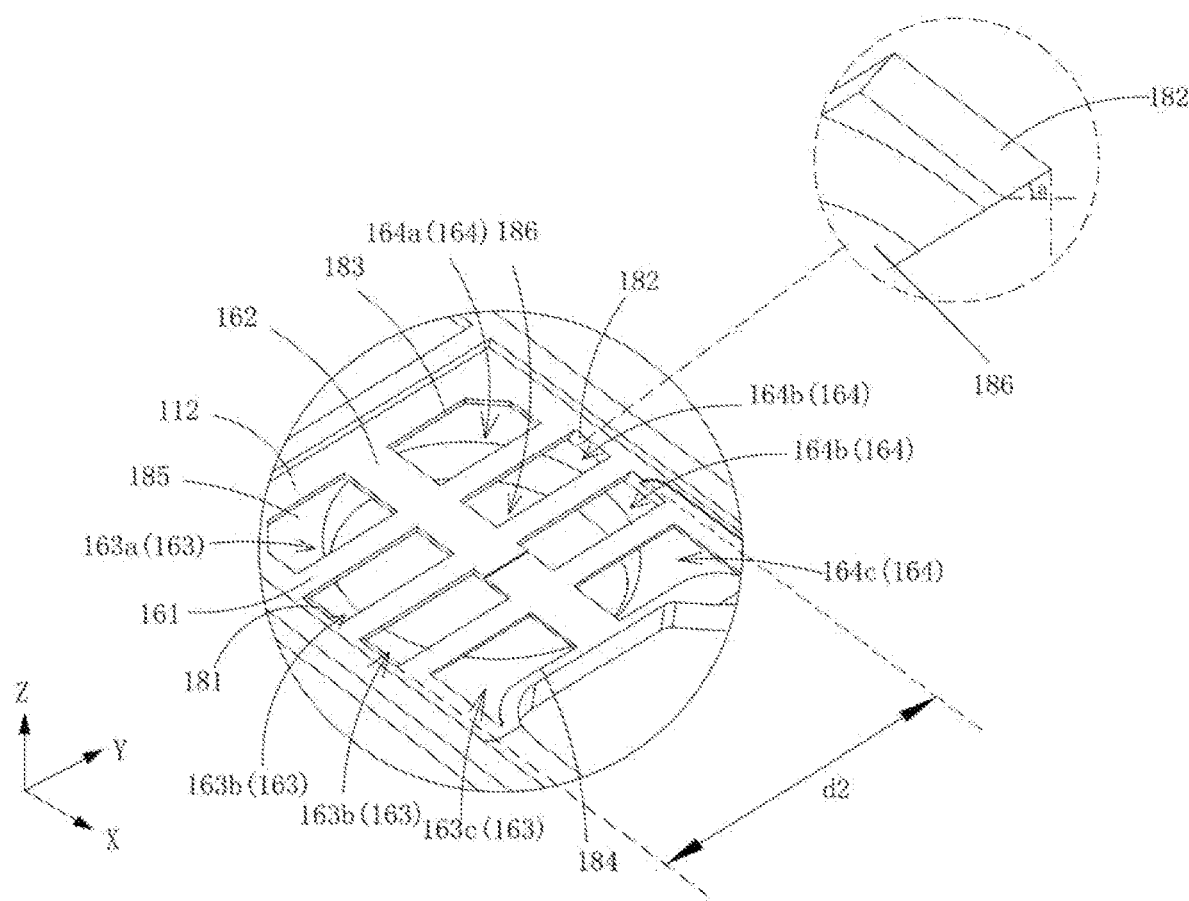
FIG. 4 is an enlarged schematic view of region M illustrated in FIG. 3.

The following is a detailed description with reference to FIG. 4, where FIG. 4 is an enlarged schematic view of region M illustrated in FIG. 3.

The first recess 18 includes a first sidewall 181, a second sidewall 182, a third sidewall 183, a fourth sidewall 184, and a first bottom-wall 185. It can be understood that in this embodiment, the first recess 18 is substantially defined by four sidewalls cooperatively. In other embodiments, the first recess 18 may be in other shapes, which are not limited herein. The first sidewall 181 and the second sidewall 182 are disposed opposite to each other. The third sidewall 183 and the fourth sidewall 184 are disposed opposite to each other. The third sidewall 183 and the fourth sidewall 184 both are connected between the first sidewall 181 and the second sidewall 182. The first sidewall 181, the second sidewall 182, the third sidewall 183, and the fourth sidewall 184 surround a periphery of the first bottom-wall 185 in sequence, to define the first recess 18. The first vent hole 186 is defined in the first bottom-wall 185 of the first recess 18. The first vent hole 186 penetrates through a surface of the first bottom-wall 185 and the first surface 111.

In this embodiment, in the width direction of the first-lower-plastic-member body 11, two opposite ends of the fourth sidewall 184 are bent in an arc shape, and a bent direction is towards the first accommodating recess 117. The first recess 18 is adjacent to the first accommodating recess 117. The first accommodating recess 117 may be chamfered or rounded at each of two ends of the first accommodating recess 117 close to the first recess 18, or may be chamfered at one end of the first accommodating recess 17 close to the first recess 18 and be rounded at the other end of the first accommodating recess 117 close to the first recess 18. There are empty regions at two ends (in the width direction of the first-lower-plastic-member body 11) of a region between the first accommodating recess 117 and the first recess 18. The two opposite ends of the fourth sidewall 184 exactly extend to the empty regions to expand the first recess 18. In other words, the first accommodating recess 117 is avoided, and the space of the first-lower-plastic-member body 11 is also fully utilized.

The first protective grid 16 defines a first vent portion. The first vent portion is in communication with the first recess 18. A part of the first vent portion is blocked by the first connector 300a. The vent passage includes a part of the first vent portion exposed beyond the first connector 300a.

The first vent portion of the first protective grid 16 includes a first vent slot 163 and a second vent slot 164. The first vent slot 163 is spaced apart from the second vent slot 164 in the width direction of the first-lower-plastic-member body 11. A part of the first vent slot 163 close to a recess sidewall of the first recess 18 is exposed beyond the first connector 300a and is in communication with the first recess 18. A part of the second vent slot 164 close to a recess sidewall of the first recess 18 is exposed beyond the first connector 300a and is in communication with the first recess 18. The first vent slot 163 and the second vent slot 164 form the first vent portion.

Specifically, the first protective grid 16 is located in the first recess 18 and is connected to the recess sidewall of the first recess 18. In a direction towards the second surface 112, the first protective grid 16 covers the first vent hole 186. The first protective grid 16 includes multiple first dividers 161 and a second divider 162. The multiple first dividers 161 are arranged side by side at intervals in the length direction (i.e., the X-axis direction) of the first-lower-plastic-member body 11. Each first divider 161 is connected to the first sidewall 181 of the first recess 18 and the second sidewall 182 of the first recess 18 that are opposite to each other in the Y-axis direction. In this embodiment, the number of the second divider 162 is one. The second divider 162 substantially penetrates through the middle of each of the multiple first dividers 161 in the X-axis direction, and is connected to the multiple first dividers 161. Two opposite ends of the second divider 162 are connected to the third sidewall 183 of the first recess 18 and the fourth sidewall 184 of the first recess 18 that are opposite to each other in the X-axis direction. In practice, it is equivalent that each of the multiple first dividers 161 is divided by the second divider 162 into two parts, and the two parts are located at two sides of the second divider 162. In this embodiment, the first protective grid 16 substantially has a structure in a shape of a Chinese character "丰".

The first divider 161 and the second divider 162 are disposed in an intersected manner and cooperatively define the first vent slot 163 and the second vent slot 164. It can be understood that in the first recess 18, the multiple first dividers 161 and the second divider 162 cooperatively define multiple first vent slots 163 and multiple second vent slots 164. The multiple first vent slots 163 are located side by side in the X-axis direction. Two adjacent first vent slots 163 are spaced apart by one first divider 161. The multiple second vent slots 164 are located side by side in the X-axis direction. Two adjacent second vent slots 164 are spaced apart by one first divider 161. In the width direction (i.e., the Y-axis direction) of the first-lower-plastic-member body 11, the multiple second vent slots 164 correspond to the multiple first vent slots 163 one by one. In other words, a second vent slot 164 and a corresponding first vent slot 163 are located side by side in the Y-axis direction. The second vent slot 164 and the corresponding first vent slot 163 are spaced apart by the second divider 162. In the Z-axis direction, each of the multiple first vent slots 163 and the multiple second vent slots 164 is in communication with the first vent hole 186, so as to convey the pressure gas generated in the electrode assembly 200. In the width direction of the first-lower-plastic-member body 11, a sum of a dimension of the first vent slot 163, a dimension of the second vent slot 164, and a dimension of the second divider 162 is greater than a width of the first connector 300a.

In this embodiment, the number of the second dividers 162 is one. In other embodiments, the number of the second dividers 162 may also be two or more.

As illustrated in FIG. 4, in this embodiment, the number of the first dividers 161 is three. The multiple first vent slots 163 include one first vent sub-slot 163a, two second vent sub-slots 163b, and one third vent sub-slot 163c. The two second vent sub-slots 163b are located adjacent to each other. The first vent sub-slot 163a and the third vent sub-slot 163c are located at two opposite sides of the two second vent sub-slots 163b in the X-axis direction. Specifically, in the Y-axis direction, a length of each of the two second vent sub-slots 163b is greater than each of a length of the first vent sub-slot 163a and a length of the third vent sub-slot 163c.

The multiple second vent slots 164 include one fourth vent sub-slot 164a, two fifth vent sub-slots 164b, and one sixth vent sub-slot 164c. The two fifth vent sub-slots 164b are located adjacent to each other. The fourth vent sub-slot 164a and the sixth vent sub-slot 164c are located at two opposite sides of the two fifth vent sub-slots 164b in the X-axis direction. Specifically, in the Y-axis direction, a length of each fifth vent sub-slots 164b is greater than each of a length of the fourth vent sub-slot 164a and a length of the sixth vent sub-slot 164c.

In the Y-axis direction, a sum of a dimension of the second vent sub-slot 163b, a dimension of the fifth vent sub-slot 164b, and the dimension of the second divider 162 is greater than the dimension of the first connector 300a. In the Y-axis direction, a sum of a dimension of the third vent sub-slot 163c, a dimension of the sixth vent sub-slot 164c, and the dimension of the second divider 162 is greater than the dimension of the first connector 300a. In the Y-axis direction, a sum of a dimension of the first vent sub-slot 163a, a dimension of the fourth vent sub-slot 164a, and the dimension of the second divider 162 is greater than the dimension of the first connector 300a. It can also be understood that at least one of the described sums of dimensions of vent sub-slots and the dimension of the second divider 162 is greater than the first connector 300a, so as to ensure that the vent sub-slot is exposed beyond the first connector 300a.

In this embodiment, the first divider 161 has an elongated shape. Two ends of the fourth sidewall 184 are arc-shaped. The third vent sub-slot 163c and the sixth vent sub-slot 164c are located between the first divider 161 and the fourth sidewall 184. Thus, each of the third vent sub-slot 163c and the sixth vent sub-slot 164c has a profile substantially in a shape of a cat ear with a sharp corner region, and the sharp corner region is away from the first vent hole 186.

In the X-axis direction, each of a width of the first vent sub-slot 163a and a width of the fourth vent sub-slot 164a is greater than each of a width of the second vent sub-slot 163b and a width of the fifth vent sub-slot 164b. In the Y-axis direction, each of a length of the first vent sub-slot 163a and a length of the fourth vent sub-slot 164a is less than each of a length of the second vent sub-slot 163b and a length of the fifth vent sub-slot 164b.

In other embodiments, the number of the first dividers 161 is not limited, that is, the number of the first vent slot 163 and the number of the second vent slot 164 are not limited.

In this embodiment, in the first recess 18, a wall surface of the first sidewall 181 and a wall surface of the second sidewall 182 that is opposite to the first sidewall 181 are inclined towards the center of the first recess 18. Specifically, the first sidewall 181 is connected between the surface of the first bottom-wall 185 and the second surface 112. The second sidewall 182 is connected between the surface of the first bottom-wall 185 and the second surface 112. The first sidewall 181, the second sidewall 182, the third sidewall 183, and the fourth sidewall 184 are collectively called a recess sidewall of the first recess 18. A wall surface of the recess sidewall is inclined towards the first recess 18 at an angle of 5 degrees to 40 degrees. The wall surface of the recess sidewall is at an obtuse angle to the second surface. At least the first sidewall 181 and the second sidewall 182 in the first sidewall 181, the second sidewall 182, the third sidewall 183, and the fourth sidewall 184 each have the wall surface inclined towards the center of the first recess 18. Specifically, the third sidewall 183 is connected between the surface of the first bottom-wall 185 and the second surface 112. The fourth sidewall 184 is connected between the surface of the first bottom-wall 185 and the second surface 112.

Figure 7:
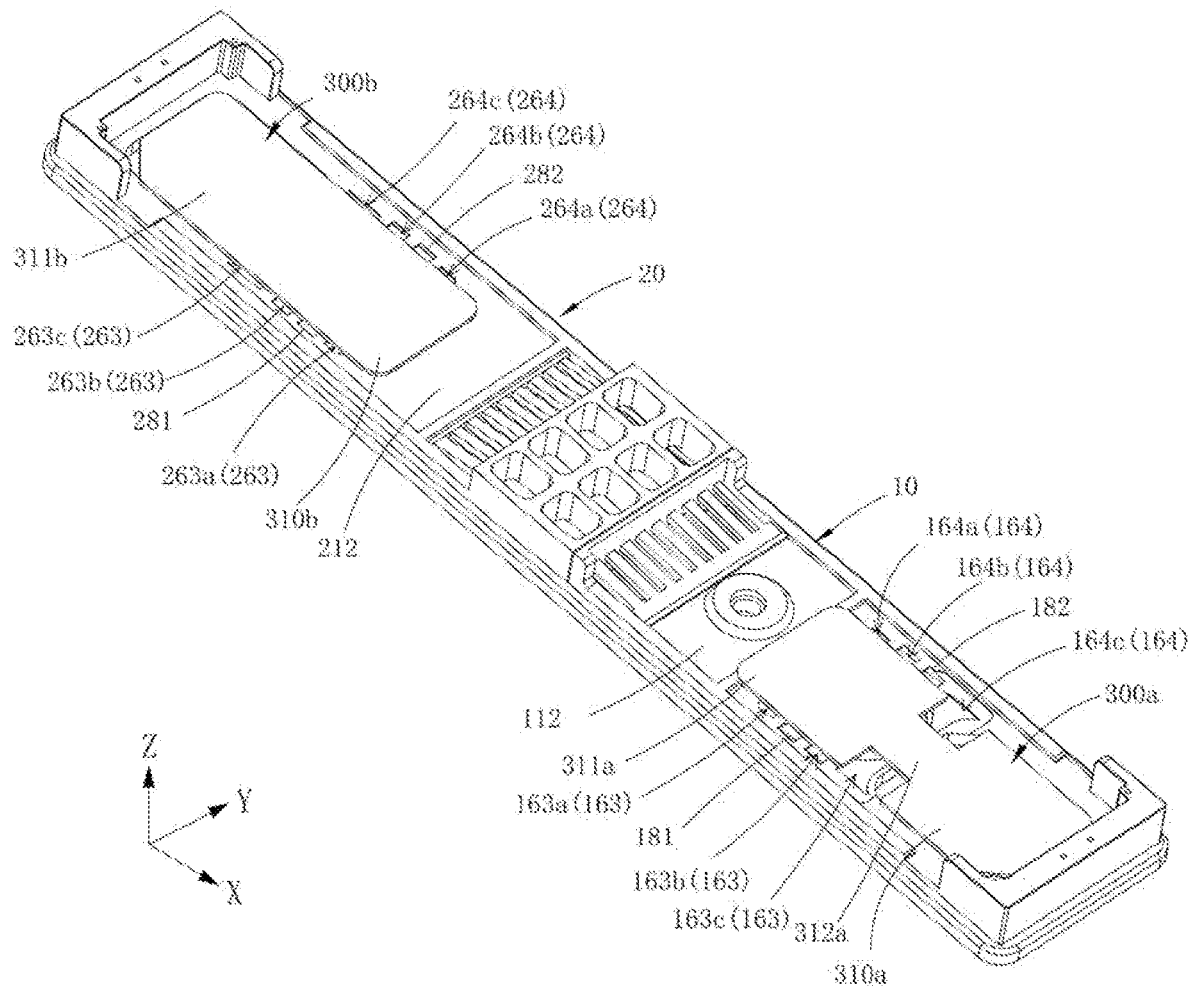
FIG. 7 is a partial structural assembly view of the energy-storage apparatus illustrated in FIG. 3.
Figure 8:
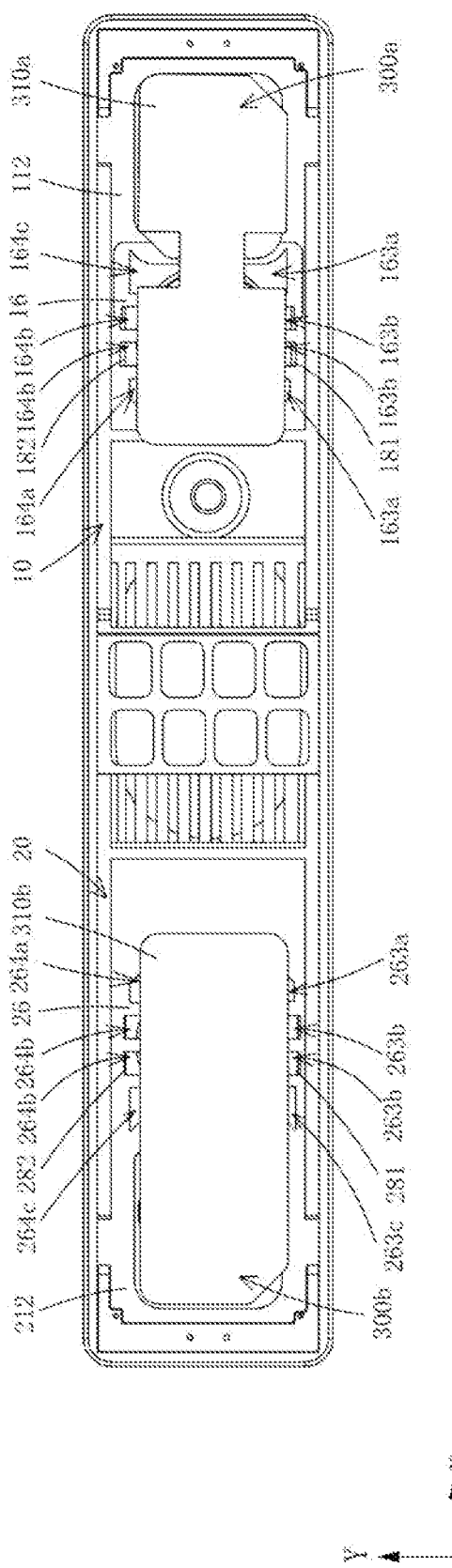
FIG. 8 is a partial schematic structural plan view of the energy-storage apparatus illustrated in FIG. 7.

Reference can be made to FIG. 7 and FIG. 8, where FIG. 7 is a partial structural assembly view of the energy-storage apparatus 1000 illustrated in FIG. 3, and FIG. 8 is a partial schematic structural plan view of the energy-storage apparatus 1000 illustrated in FIG. 7.

In this embodiment, the first connector 300a is stacked on the second surface 112 to block the first vent hole 186 and the first pole through-hole 17. In the width direction (i.e., the Y-axis direction) of the end cover assembly 100, a width of the first tab-connecting-body 310a of the first connector 300a is less than a width of the first recess 18, and is less than a length of the second divider 162 of the first protective grid 16.

In this embodiment, the first tab-connecting-body 310a of the first connector 300a blocks a part of the first recess 18. The first connector 300a is symmetrical about a width center line of the first lower plastic member 10. In other words, the first connector 300a deflects towards no side of the second surface 112. Specifically, the first tab-connecting-body 310a blocks the first recess 18. In the width direction (i.e., the Y-axis direction) of the end cover assembly 100, a region where the two second vent sub-slots 163b and the two fifth vent sub-slots 164b, the third vent sub-slot 163c and the sixth vent sub-slot 164c, and the first vent sub-slot 163a and the fourth vent sub-slot 164a are located at a side of the second surface 112, is exposed relative to the first connector 300a (not blocked by the first connector 300a). An exposed region may be called a vent passage S. In other words, in the width direction of the end cover assembly 100, the first tab-connecting-body 310a blocks a part of each of the second vent sub-slot 163b and the fifth vent sub-slot 164b, a part of each of the third vent sub-slot 163c and the sixth vent sub-slot 164c, and a part of each of the first vent sub-slot 163a and the fourth vent sub-slot 164a. In other words, the vent passage S is located at two opposite sides of the first connector 300a and is exposed relative to the first connector 300a. In addition, the second vent sub-slot 163b and the fifth vent sub-slot 164b, the third vent sub-slot 163c and the sixth vent sub-slot 164c, and the first vent sub-slot 163a and the fourth vent sub-slot 164a both are in communication with the first vent hole 186. The vent passage S is in communication with the first vent hole 186.

It may be noted that the sharp corner region of the third vent sub-slot 163c and the sharp corner region of the sixth vent sub-slot 164c can increase a gas flow area. In addition, the first bottom-wall 185 sinks into the first-lower-plastic-member body 11. Gas can flow towards the first vent hole 186 through the third vent sub-slot 163c having the sharp corner region and the sixth vent sub-slot 164c having the sharp corner region. Thus, smoothness and flow rate of gas flow are ensured. After the electrode assembly 200 is physically connected to the end cover assembly 100 by means of the first connector 300a, pressure air generated in the housing 400 can smoothly flow through the first vent hole 186 via the vent passage S to enter nearby space right below the first stimulus-response member 45, and applies a pressure to the first stimulus-response member 45, so that the first stimulus-response member 45 is flipped over. Air isolation formed below the first stimulus-response member 45 can be avoided. When an internal pressure of the energy-storage apparatus is higher than a threshold pressure, it is ensured that the first stimulus-response member 45 can be normally triggered to flip over. At this time, the first stimulus-response member 45 is in contact with the conductive pressing block, and an external short circuit is realized for the positive pole 71. An auxiliary vent hole is located in a region where the first sidewall 181 and the second sidewall 182 are located. Each of the wall surface of the first sidewall 181 and the wall surface of the second sidewall 182 is an inclined surface. Thus, a gas circulation area can be increased, and pressure gas flow can be further guided to smoothly flow to the first stimulus-response member 45, thereby improving reliability of the first stimulus-response member 45.

Figure 9:
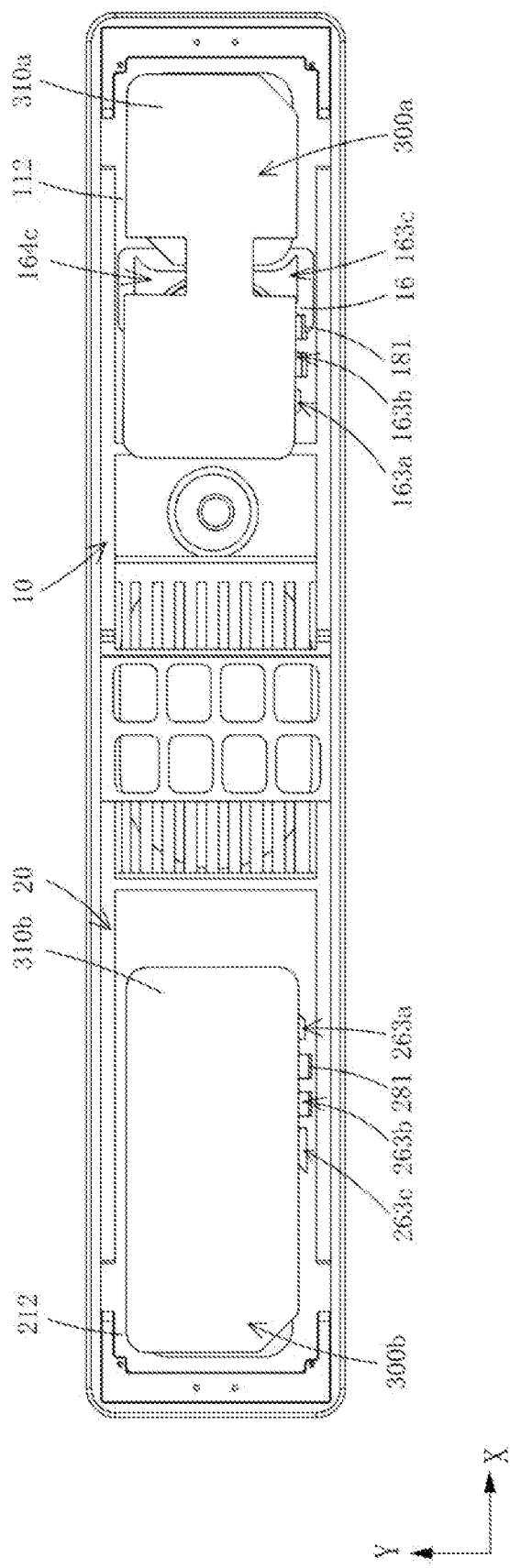
FIG. 9 is a partial schematic structural plan view of an energy-storage apparatus provided in another embodiment of the present disclosure.

Reference can be made to FIG. 9, where FIG. 9 is a partial structural assembly view of an energy-storage apparatus provided in another embodiment of the present disclosure. This embodiment is different from the embodiment illustrated in FIG. 7 in that the first connector 300a is stacked on the second surface 112 and is close to a side of the second surface 112, so as to completely block the fourth vent sub-slot 164a, the two fifth vent sub-slots 164b, and the sixth vent sub-slot 164c.

Specifically, referring to FIG. 9, the first tab-connecting-body 310a blocks the first recess 18. In the width direction (i.e., the Y-axis direction) of the end cover assembly 100, a region where the first vent sub-slot 163a, the two second vent sub-slots 163b, and the third vent sub-slot 163c are located at a side of the second surface 112, is exposed relative to the first connector 300a (not blocked by the first connector 300a). An exposed region may be called the vent passage S (including a part of the first recess 18 that is exposed beyond the first connector 300a and a region where the first vent portion is exposed beyond the first connector 300a). In other words, in the width direction of the end cover assembly 100, the first tab-connecting-body 310a blocks a part of the first vent sub-slot 163a, a part of the second vent sub-slot 163b, and a part of the third vent sub-slot 163c. The first tab-connecting-body 310a of the first connector 300a completely blocks the fourth vent sub-slot 164a, the two fifth vent sub-slots 164b, and the sixth vent sub-slot 164c. The part of the first vent sub-slot 163a, the part of the second vent sub-slot 163b, and the part of the third vent sub-slot 163c are exposed beyond the first connector 300a at a side of the first connector 300a. In other words, the vent passage S is located at a side of the first connector 300a and is exposed relative to the first connector 300a. In addition, the first vent sub-slot 163a, the second vent sub-slot 163b, and the third vent sub-slot 163c are in communication with the first vent hole 186. The vent passage S is in communication with the first vent hole 186.

After the electrode assembly 200 is physically connected to the end cover assembly 100 by means of the first connector 300a, the pressure air generated in the housing 400 can smoothly flow through the first vent hole 186 via the vent passage S to enter nearby space right below the first stimulus-response member 45, and applies the pressure to the first stimulus-response member 45, so that the first stimulus-response member 45 is flipped over. The air isolation is formed below the first stimulus-response member 45 can be avoided. When the internal pressure of the energy-storage apparatus is higher than a threshold pressure, it is ensured that the first stimulus-response member 45 can be normally triggered to flip over. At this time, the first stimulus-response member 45 is in contact with the conductive pressing block, and the external short circuit is realized for the positive pole 71. The vent passage is located in a region where the first sidewall 181 is located. The wall surface of the first sidewall 181 is an inclined surface. Thus, the gas circulation area can be increased, and the pressure gas flow can be further guided to smoothly flow to the first stimulus-response member 45, thereby improving the reliability of the first stimulus-response member 45.

In an embodiment of the present disclosure, the second connector 300b is stacked on the fourth surface 212 of the second-lower-plastic-member body 21. The second connector 300b blocks a part of the second recess 28. A vent passage is defined between the second connector 300b and the second recess 28. The vent passage is in communication with the second vent hole 286. Specifically, in the width direction of the second-lower-plastic-member body 21, a dimension of the second connector 300b is less than a dimension of the second recess 28. In the width direction of the second-lower-plastic-member body 21, a ratio of the dimension d3 of the second connector 300b to a dimension d4 of the second recess 28 is 1.01 to 1.4.

In an implementation, in the width direction of the second-lower-plastic-member body 21, the vent passage is located at two opposite sides of the second connector 300b. In another implementation, in the width direction of the second-lower-plastic-member body 21, the vent passage is located at a side of the second connector 300b.

Figure 5:
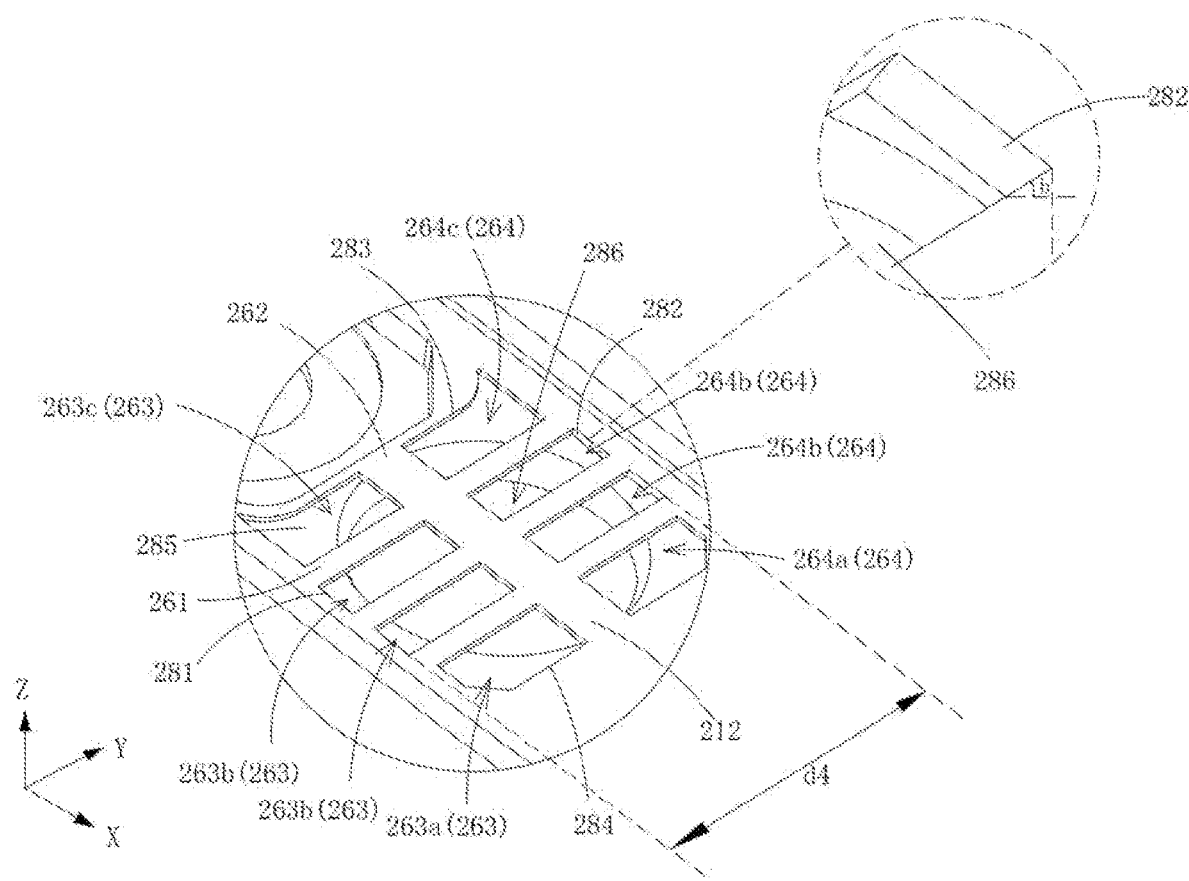
FIG. 5 is an enlarged schematic view of region N illustrated in FIG. 3.

The following is a detailed description with reference to FIG. 5, where FIG. 5 is an enlarged schematic view of region N illustrated in FIG. 3.

The second recess 28 includes a fifth sidewall 281, a sixth sidewall 282, a seventh sidewall 283, an eighth sidewall 284, and a second bottom-wall 285. It can be understood that in this embodiment, the second recess 28 is substantially defined by four sidewalls cooperatively. In other embodiments, the second recess 28 may be in other shapes, which are not limited herein. The fifth sidewall 281 and the sixth sidewall 282 are disposed opposite to each other. The seventh sidewall 283 and the eighth sidewall 284 are disposed opposite to each other. The seventh sidewall 283 and the eighth sidewall 284 both are connected between the fifth sidewall 281 and the sixth sidewall 282. The fifth sidewall 281, the sixth sidewall 282, the seventh sidewall 283, and the eighth sidewall 284 surround a periphery of the second bottom-wall 285 in sequence, to define the second recess 28. The second vent hole 286 is defined in the second bottom-wall 285 of the second recess 28. The second vent hole 286 penetrates through a surface of the second bottom-wall 285 and the third surface 211.

In this embodiment, in the width direction of the second-lower-plastic-member body 21, two opposite ends of the eighth sidewall 284 are bent in an arc shape, and a bent direction is towards the second accommodating recess 217. The second recess 28 is adjacent to the second accommodation recess 217. The second accommodating recess 217 may be chamfered or rounded at each of two ends of the second accommodating recess 217 close to the second recess 28, or may be chamfered at one end of the second accommodating recess 217 close to the second recess 28 and be rounded at the other end of the second accommodating recess 217 close to the second recess 28. There are empty regions at two ends (in the width direction of the second-lower-plastic-member body 21) of region between the second accommodation recess 217 and the second recess 28. The two opposite ends of the eighth sidewall 284 exactly extend to the empty regions to expand the second recess 28. In other words, the second accommodation recess 217 is avoided, and the space of the second-lower-plastic-member body 21 is also fully utilized.

The second protective grid 26 defines a second vent portion. The second vent portion is in communication with the second recess 28. A part of the second vent portion is blocked by the second connector 300b. The vent passage includes a part of the second vent portion is exposed beyond the second connector 300b.

The second protective grid 26 is located in the second recess 28 and is connected to a sidewall of the second recess 28. In a direction towards the fourth surface 212, the second protective grid 26 covers the second vent hole 286. The second protective grid 26 includes multiple third dividers 261 and a fourth divider 262. The multiple third dividers 261 are arranged side by side at intervals in the length direction (i.e., the X-axis direction) of the second-lower-plastic-member body 21. Each third divider 261 is connected to the fifth sidewall 281 of the second recess 28 and the sixth sidewall 282 of the second recess 28 that are opposite to each other in the Y-axis direction. In this embodiment, the number of the fourth divider 262 is one. The fourth divider 262 substantially penetrates through the middle of each of multiple third dividers 261 in the X-axis direction, and is connected to the multiple third dividers 261. The two opposite ends of the fourth separating plate 262 are connected to the seventh sidewall 283 of the second recess 28 and the eighth sidewall 284 of the second recess 28 that are opposite to each other in the X axial direction. In practice, it is equivalent that each of the multiple third dividers 261 is divided by the fourth divider 262 into two parts, and the two parts are located at two sides of the fourth divider 262. In this embodiment, the second protective grid 26 is substantially has a structure in a shape of a Chinese character "丰".

It can be understood that in the second recess 28, the multiple third dividers 261 and the fourth divider 262 cooperatively define multiple third vent slots 263 and multiple fourth vent slots 264. The multiple third vent slots 263 are located side by side in the X-axis direction. Two adjacent third vent slots 263 are spaced apart by one third divider 261. The multiple fourth vent slots 264 are located side by side in the X-axis direction. Two adjacent fourth vent slots 264 are spaced apart by one third divider 261. In the width direction (i.e., the Y-axis direction) of the first-lower-plastic-member body 11, the multiple fourth vent slots 264 correspond to the multiple third vent slots 263 one by one. In other words, a fourth vent slot 264 and a corresponding third vent slot 263 are located side by side in the Y-axis direction. The fourth vent slot 264 and the corresponding third vent slot 263 are spaced apart by the fourth divider 262. In the Z-axis direction, each of the multiple third vent slots 263 and the multiple fourth vent slots 264 is in communication with the second vent hole 286, so as to convey the pressure gas generated in the electrode assembly 200. In the width direction of the first-lower-plastic-member body 11, a sum of a dimension of the fourth vent slot 264, a dimension of the third vent slot 263, and a dimension of the fourth divider 262 is greater than a width of the second connector 300b.

In this embodiment, the number of the fourth dividers 262 is one. In other embodiments, the number of the fourth dividers 262 may also be two or more.

In an implementation, a part of the third vent slot 263 close to the recess sidewall of the second recess 28 is exposed beyond the second connector 300b and is in communication with the second recess 28. In an implementation, a part of the fourth vent slot 264 close to the recess sidewall of the second recess 28 is exposed beyond the second connector 300b and is in communication with the second recess 28.

In an implementation, a part of the third vent slot 263 close to the recess sidewall of the second recess 28 is exposed beyond the second connector 300b. A part of the fourth vent slot 264 close to the recess sidewall of the second recess 28 is exposed beyond the second connector 300b.

As illustrated in FIG. 5, in this embodiment, the number of the third dividers 261 is three. The multiple third vent slots 263 include one seventh vent sub-slot 263a, two eighth vent sub-slots 263b, and one ninth vent sub-slot 263c. The two eighth vent sub-slots 263b are located adjacent to each other. The seventh vent sub-slot 263a and the ninth vent sub-slot 263c are located at two opposite sides of the two eighth vent sub-slots 263b in the X-axis direction. Specifically, in the Y-axis direction, a length of each eighth vent sub-slot 263b is greater than each of a length of the seventh vent sub-slot 263a and a length of the ninth vent sub-slot 263c.

The multiple fourth vent slots 264 include one tenth vent sub-slot 264a, two eleventh vent sub-slots 264b, and one twelfth vent sub-slot 264c. The two eleventh vent sub-slots 264b are located adjacent to each other. The tenth vent sub-slot 264a and the twelfth vent sub-slot 264c are located at two opposite sides of the two eleventh vent sub-slots 264b in the X-axis direction. Specifically, in the Y-axis direction, a length of each eleventh vent sub-slot 264b is greater than each of a length of the tenth vent sub-slot 264a and a length of the twelfth vent sub-slot 264c.

In the Y-axis direction, a sum of a dimension of the eighth vent sub-slot 263b, a dimension of the eleventh vent sub-slot 264b, and a dimension of the fourth divider 262 is greater than a dimension of the second connector 300b. In the Y-axis direction, a sum of a dimension of the ninth vent sub-slot 263c, a dimension of the twelfth vent sub-slot 264c, and a dimension of the fourth divider 262 is greater than the dimension of the second connector 300b. In the Y-axis direction, a sum of a dimension of the seventh vent sub-slot 263a, a dimension of the tenth vent sub-slot 264a, and a dimension of the fourth divider 262 is greater than the dimension of the second connector 300b. It can also be understood that at least one of the described sums of dimensions of vent sub-slots and the dimension of the fourth divider 262 is greater than the second connector 300b, so as to ensure that the vent sub-slot is exposed beyond the second connector 300a.

In this embodiment, the third divider 261 has an elongated shape. Two ends of the seventh sidewall 283 are arc-shaped. The ninth vent sub-slot 263c and the twelfth vent sub-slot 264c are located between the third divider 261 and the seventh sidewall 283. Thus, each of the ninth vent sub-slot 263c and the twelfth vent sub-slot 264c has a profile in a shape of a cat ear with a sharp corner region, and the sharp corner region is away from the second vent hole 286.

In the X-axis direction, each of a width of the seventh vent sub-slot 263a and a width of the tenth vent sub-slot 264a is larger than each of a width of the eighth vent sub-slot 263b and a width of the eleventh vent sub-slot 264b. In the Y-axis direction, each of a length of the seventh vent sub-slot 263a and a length of the tenth vent sub-slot 264a is less than each of a length of the eighth vent sub-slot 263b and a length of the eleventh vent sub-slot 264b.

In other embodiments, the number of the third dividers 261 is not limited, that is, the number of the third vent slot 263 and the number of the fourth vent slot 264 are not limited.

In this embodiment, in the second recess 28, a wall surface of the fifth sidewall 281 and a wall surface of the sixth sidewall 282 that is opposite to the fifth sidewall 281 are inclined towards the center of the second recess 28. Specifically, the fifth sidewall 281 is connected between the surface of the second bottom-wall 285 and the fourth surface 212. The sixth sidewall 282 is connected between the surface of the second bottom-wall 285 and the fourth surface 212. A wall surface of the seventh sidewall 283 and a wall surface of the eighth sidewall 284 are inclined towards the center of the second recess 28. Specifically, the seventh sidewall 283 is connected between the surface of the second bottom-wall 285 and the fourth surface 212. The eighth sidewall 284 is connected between the surface of the second bottom-wall 285 and the fourth surface 212. The fifth sidewall 281, the sixth sidewall 282, the seventh sidewall 283, and the eighth sidewall 284 are a recess sidewall of the second recess 28. A wall surface of the recess sidewall is inclined towards the second recess 28 at an angle of 5 degrees to 40 degrees.

Referring to FIG. 7 and FIG. 8 again, in this embodiment, the second connector 300b is stacked on the fourth surface 212 to block the second vent hole 286 and the second pole through-hole 27. In the width direction (i.e., the Y-axis direction) of the end cover assembly 100, a width dimension of the second tab-connecting-body 310b of the second connector 300b is less than a width dimension of the second recess 28, and is less than a length of the fourth divider 262 of the second protective grid 26.

In this embodiment, the second tab-connecting-body 310b of the second connector 300b blocks a part of the second recess 28. The second connector 300b is symmetrical about a width center line of the second lower plastic member 20. In other words, the second connector 300b deflects towards no side of the fourth surface 212. Specifically, the second tab-connecting-body 310b blocks the second recess 28. In the width direction (i.e., the Y-axis direction) of the end cover assembly 100, a region where the two eighth vent sub-slots 263b and the two eleventh vent sub-slots 264b, the ninth vent sub-slot 263c and the twelfth vent sub-slot 264c, the seventh vent sub-slot 263a and the tenth vent sub-slot 264a are located at a side of the fourth surface 212, is exposed relative to the second connector 300b (not blocked by the second connector 300b). An exposed region may be called the vent passage S (including a part of the second recess 28 that is exposed beyond the second connector 300b and a region where the second vent portion is exposed beyond the second connector 300b). In other words, in the width direction of the end cover assembly 100, the second tab-connecting-body 310b blocks a part of each of the eighth vent sub-slot 263b and the eleventh vent sub-slot 264b, a part of each of the ninth vent sub-slot 263c and the twelfth vent sub-slot 264c, and a part of each of the seventh vent sub-slot 263a and the tenth vent sub-slot 264a. In other words, the vent passage S is located at two opposite sides of the second connector 300b and is exposed relative to the second connector 300b. In addition, the eighth vent sub-slot 263b and the eleventh vent sub-slot 264b, the ninth vent sub-slot 263c and the twelfth vent sub-slot 264c, and the seventh vent sub-slot 263a and the tenth vent sub-slot 264a each are in communication with the second vent hole 286. The vent passage S is in communication with the second vent hole 286. The second bottom-wall 285 sinks into the second-lower-plastic-member body 21. Gas can flow towards the second vent hole 286 through the ninth vent sub-slot 263c and the twelfth vent sub-slot 264c. Thus, smoothness and flow rate of gas flow are ensured. After the electrode assembly 200 is physically connected to the end cover assembly 100 by means of the second connector 300b, pressure air generated in the housing 400 can smoothly flow through the second vent hole 286 via the vent passage S to ensure nearby space right below the second stimulus-response member 46, and applies a pressure to the second stimulus-response member 46, so that the second stimulus-response member 46 is flipped over. Air isolation formed below the second stimulus-response member 46 can be avoided. When the internal pressure of the energy-storage apparatus is higher than the threshold pressure, it is ensured that the second stimulus-response member 46 can be normally triggered to flip over. At this time, the second stimulus-response member 46 is in contact with the conductive pressing block, and an external short circuit is realized for the negative pole 72. The vent passage S is located in a region where the first sidewall 181 and the second sidewall 182 are located. Each of the wall surface of the first sidewall 181 and the wall surface of the second sidewall 182 is an inclined surface. Thus, a gas circulation area can be increased, and pressure gas flow can be further guided to smoothly flow to the second stimulus-response member 46, thereby improving reliability of the second stimulus-response member 46.

Referring to FIG. 9 again, in this embodiment, the second connector 300b is stacked on the fourth surface 212 and is close to a side of the fourth surface 212, so as to completely block the tenth vent sub-slot 264a, two eleventh vent sub-slots 264b, and the twelfth vent sub-slot 264c.

Specifically, the second tab-connecting-body 310b blocks the second recess 28. In the width direction (i.e., the Y-axis direction) of the end cover assembly 100, a region where the seventh vent sub-slot 263a, the two eighth vent sub-slots 263b, and the ninth vent sub-slot 263c are located at a side of the fourth surface 212, is exposed relative to the second connector 300b (not blocked by the second connector 300b). An exposed region may be called the vent passage S (including a part of the second recess 28 that is exposed beyond the second connector 300b and a region where the second vent portion is exposed beyond the second connector 300b). In other words, in the width direction of the end cover assembly 100, the second tab-connecting-body 310b blocks a part of the seventh vent sub-slot 263a, a part of the eighth vent sub-slot 263b, and a part of the ninth vent sub-slot 263c. The second tab-connecting-body 310b of the second connector 300b completely blocks the tenth vent sub-slots 264a, the two eleventh vent sub-slots 264b, and the twelfth vent sub-slot 264c. The part of the seventh vent sub-slot 263a, the part of the eighth vent sub-slot 263b, and the part of the ninth vent sub-slot 263c are exposed beyond the second connector 300b at a side of the second connector 300b. In other words, the vent passage S is located at a side of the second connector 300b and is exposed relative to the second connector 300b. In addition, the seventh vent sub-slot 263a, the eighth vent sub-slot 263b, and the ninth vent sub-slot 263c are in communication with the second vent hole 286. The vent passage S is in communication with the second vent hole 286. After the electrode assembly 200 is physically connected to the end cover assembly 100 by means of the second connector 300b, the pressure air generated in the housing 400 can smoothly flow through the second vent hole 286 via the vent passage S to enter nearby space right below the second stimulus-response member 46, and applies the pressure to the second stimulus-response member 46, so that the second stimulus-response member 46 is flipped over. The air isolation formed below the second stimulus-response member 46 can be avoided. When the internal pressure of the energy-storage apparatus is higher than the threshold pressure, it is ensured that the second stimulus-response member 46 can be normally triggered to flip over. At this time, the second stimulus-response member 46 is in contact with the conductive pressing block, and the external short circuit is realized for the negative pole 72. An auxiliary vent hole is located in a region where the fifth sidewall 281 is located. The wall surface of the fifth sidewall 281 is an inclined surface. Thus, the gas circulation area can be increased, and the pressure gas flow can be further guided to smoothly flow to the second stimulus-response member 46, thereby improving the reliability of the second stimulus-response member 46.

In this embodiment of the present disclosure, the second connector 300b is stacked on the fourth surface 212 of the second-lower-plastic-member body 21. The second connector 300b blocks a part of the second recess 28. A vent passage is defined between the second connector 300b and the second recess 28. The vent passage is in communication with the second vent hole 286. Specifically, in the width direction of the second-lower-plastic-member body 21, a dimension of the second connector 300b is less than a maximum dimension of the second recess 28. In an embodiment, a cross-sectional area of the vent passage S is three-fifths to nine-tenths of a cross-sectional area of the second recess 28.

In an implementation, in the width direction of the second-lower-plastic-member body 21, the vent passage is located at two opposite sides of the second connector 300b.

In another implementation, in the width direction of the second-lower-plastic-member body 21, the vent passage is located at a side of the second connector 300b.

According to the energy-storage apparatus in embodiments of the present disclosure, the vent passage is formed at a side of the connector or two sides of the connector. The vent passage is located at a side of the connector and is exposed beyond the connector. The vent passage is in communication with the vent hole. After a cell is packaged with the end cover assembly by the connector, air pressure generated in the cell can smoothly flow through the vent hole via the vent passage to enter space near the stimulus-response member, so that a pressure adjustment function of the stimulus-response member can be normally triggered.

The embodiments of the present disclosure are introduced in detail above. The principles and implementations of the present disclosure are described by applying specific examples in this specification, and the descriptions of the embodiments are merely intended to help understand the method and the core ideas of the present disclosure. Meanwhile, a person of ordinary skill in the art may make modifications to the specific implementations and application scopes according to the ideas of the present disclosure. In conclusion, the content of the specification may not be construed as a limitation to the present disclosure

What is claimed is:

1. An energy-storage apparatus, comprising:
a housing having an opening and defining an accommodating cavity;
an electrode assembly accommodated in the accommodating cavity; and
an end cover assembly sealing the opening, wherein
the end cover assembly comprises a top cover and a lower plastic assembly, and the lower plastic assembly is disposed between the top cover and the electrode assembly; and the top cover comprises a first stimulus-response member, and the first stimulus-response member is configured to deform in response to a pressure increase in the energy-storage apparatus;
the lower plastic assembly at least comprises a first-lower-plastic-member body, the first-lower-plastic-member body has a first surface facing the top cover and a second surface opposite to the first surface, the first-lower-plastic-member body defines a first recess and a first vent hole penetrating through the first surface and the second surface, and the first recess is recessed from the second surface to the first surface; and
the first vent hole is defined in a recess bottom-wall of the first recess, and penetrates through the recess bottom-wall and the first surface in a thickness direction of the first-lower-plastic-member body, and the first vent hole is opposite to the first stimulus-response member in the thickness direction of the end cover assembly;
a first connector connected between the end cover assembly and the electrode assembly, a part of the first recess being blocked by the first connector, the rest of the first recess exposed beyond the first connector forming a vent passage, and the vent passage being in communication with the first vent hole, wherein
a first protective grid is disposed in the first recess, the first protective grid is connected to a recess sidewall of the first recess, and in a direction towards the second surface, the first protective grid is located above the first vent hole;

the first protective grid defines a first vent portion, the first vent portion is in communication with the first recess, a part of the first vent portion is blocked by the first connector, and the vent passage comprises a part of the first vent portion exposed beyond the first connector; and a cross-sectional area of the vent passage is three-fifths to nine-tenths of a cross-sectional area of the first recess.

2. The energy-storage apparatus of claim 1, wherein in a width direction of the first-lower-plastic-member body, a ratio of a dimension d2 of the first recess to a dimension d1 of the first connector is 1.01-1.4.

3. The energy-storage apparatus of claim 1, wherein the vent passage is located at two opposite sides of the first connector in a width direction of the first-lower-plastic-member body, or the vent passage is located at a side of the first connector in the width direction of the first-lower-plastic-member body.

4. The energy-storage apparatus of claim 1, wherein a cross-sectional area of the first vent hole is three-fifths to nine-tenths of a cross-sectional area of the first recess.

5. The energy-storage apparatus of claim 1, wherein a wall surface of a part of a recess sidewall of the first recess facing the vent passage is an inclined surface, and the inclined surface is inclined from the second surface to the first vent hole; and the wall surface of the part of the recess sidewall of the first recess is inclined at an angle a of 5 degrees to 40 degrees.

6. The energy-storage apparatus of claim 1, wherein the first vent portion of the first protective grid comprises a first vent slot and a second vent slot, and the first vent slot is spaced apart from the second vent slot in a width direction of the first-lower-plastic-member body; and a part of the first vent slot close to the recess sidewall of the first recess is exposed beyond the first connector and is in communication with the first recess; or a part of the second vent slot close to the recess sidewall of the first recess is exposed beyond the first connector and is in communication with the first recess.

7. The energy-storage apparatus of claim 1, wherein the first vent portion of the first protective grid comprises a first vent slot and a second vent slot, and the first vent slot is spaced apart from the second vent slot in a width direction of the first-lower-plastic-member body; and a part of the first vent slot close to the recess sidewall of the first recess is exposed beyond the first connector, and a part of the second vent slot close to the recess sidewall of the first recess is exposed beyond the first connector.

8. The energy-storage apparatus of claim 6, wherein the first protective grid comprises a first divider and a second divider, the first divider and the second divider both are connected to the recess sidewall of the first recess, the first divider and the second divider are disposed in an intersected manner and cooperatively define the first vent slot and the second vent slot, and the first vent slot is spaced apart from the second vent slot by the second divider.

9. The energy-storage apparatus of claim 8, wherein in the width direction of the first-lower-plastic-member body, a sum of a dimension of the first vent slot, a dimension of the second vent slot, and a dimension of the second divider is greater than a width of the first connector.

10. The energy-storage apparatus of claim 1, further comprising a second connector disposed opposite to the first connector; wherein the top cover further comprises a second stimulus-response member;

the lower plastic assembly further comprises a second-lower-plastic-member body, the second-lower-plastic-member body has a third surface facing the top cover and a fourth surface opposite to the third surface, the second-lower-plastic-member body defines a second recess and a second vent hole, and the second recess is recessed from the fourth surface to the third surface;

the second vent hole is defined in a recess bottom-wall of the second recess, and penetrates through the recess bottom-wall of the second recess and the third surface in a thickness direction of the second-lower-plastic-member body, and the second vent hole is opposite to the second stimulus-response member in the thickness direction of the end cover assembly; and the second connector is connected between the end cover assembly and the electrode assembly, a part of the second recess is blocked by the second connector, the rest of the second recess exposed beyond the second connector forms a vent passage, and the vent passage is in communication with the second vent hole.

11. The energy-storage apparatus of claim 10, wherein in a width direction of the second-lower-plastic-member body, a ratio of a dimension d4 of the second recess to a dimension d3 of the second connector is 1.01-1.4.

12. The energy-storage apparatus of claim 10, wherein the vent passage is located at two opposite sides of the second connector in a width direction of the second-lower-plastic-member body, or the vent passage is located at a side of the second connector in the width direction of the second-lower-plastic-member body.

13. The energy-storage apparatus of claim 10, wherein a wall surface of a part of a recess sidewall of the second recess facing the vent passage is an inclined surface, and the inclined surface is inclined from the fourth surface to the second vent hole; and the wall surface of the part of the recess sidewall of the second recess is inclined at an angle b of 5 degrees to 40 degrees.

14. The energy-storage apparatus of claim 10, wherein a second protective grid is disposed in the second recess, the second protective grid is connected to a recess sidewall of the second recess, and in a direction towards the fourth surface, the second protective grid is located above the second vent hole; and the second protective grid defines a second vent portion, the second vent portion is in communication with the second recess, a part of the second vent portion is blocked by the second connector, and the vent passage comprises a part of the second vent portion exposed beyond the second connector.

15. The energy-storage apparatus of claim 14, wherein the second vent portion of the second protective grid comprises a third vent slot and a fourth vent slot, and the third vent slot is spaced apart from the fourth vent slot in a width direction of the second-lower-plastic-member body; and a part of the third vent slot close to the recess sidewall of the second recess is exposed beyond the second connector and is in communication with the second recess; or a part of the fourth vent slot close to the recess sidewall of the second recess is exposed beyond the second connector and is in communication with the second recess.

16. The energy-storage apparatus of claim 14, wherein the second vent portion of the second protective grid comprises a third vent slot and a fourth vent slot, the third vent slot is spaced apart from the fourth vent slot in a width direction of the second-lower-plastic-member body; and
part of the third vent slot close to the recess sidewall of the second recess is exposed beyond the second connector, and a part of the fourth vent slot close to the recess sidewall of the second recess is exposed beyond the second connector.

17. The energy-storage apparatus of claim 15, wherein the second protective grid comprises a third divider and a fourth divider, the third divider and the fourth divider are cross-connected to the recess sidewall of the second recess, and cooperatively define the third vent slot and the fourth vent slot, and the third vent slot is spaced apart from the fourth vent slot by the fourth divider.

18. The energy-storage apparatus of claim 17, wherein in the width direction of the second-lower-plastic-member body, a sum of a dimension of the third vent slot, a dimension of the fourth vent slot, and a dimension of the fourth divider is greater than a width of the second connector.

19. An electricity-consumption device comprising an energy-storage apparatus, wherein the energy-storage apparatus is configured to power the electricity-consumption device, and the energy-storage apparatus comprises:
  a housing having an opening and defining an accommodating cavity;
  an electrode assembly accommodated in the accommodating cavity; and
  an end cover assembly sealing the opening, wherein
    the end cover assembly comprises a top cover and a lower plastic assembly, and the lower plastic assembly is disposed between the top cover and the electrode assembly; and the top cover comprises a first stimulus-response member, and the first stimulus-response member is configured to deform in response to a pressure increase in the energy-storage apparatus;
    the lower plastic assembly at least comprises a first-lower-plastic-member body, the first-lower-plastic-member body has a first surface facing the top cover and a second surface opposite to the first surface, the first-lower-plastic-member body defines a first recess and a first vent hole penetrating through the first surface and the second surface, and the first recess is recessed from the second surface to the first surface; and
    the first vent hole is defined in a recess bottom-wall of the first recess, and penetrates through the recess bottom-wall and the first surface in a thickness direction of the first-lower-plastic-member body, and the first vent hole is opposite to the first stimulus-response member in the thickness direction of the end cover assembly;
  a first connector connected between the end cover assembly and the electrode assembly, a part of the first recess being blocked by the first connector, the rest of the first recess exposed beyond the first connector forming a vent passage, and the vent passage being in communication with the first vent hole, wherein
    a first protective grid is disposed in the first recess, the first protective grid is connected to a recess sidewall of the first recess, and in a direction towards the second surface, the first protective grid is located above the first vent hole;
    the first protective grid defines a first vent portion, the first vent portion is in communication with the first recess, a part of the first vent portion is blocked by the first connector, and the vent passage comprises a part of the first vent portion exposed beyond the first connector; and
  a cross-sectional area of the vent passage is three-fifths to nine-tenths of a cross-sectional area of the first recess.

\* \* \* \* \*